(12) United States Patent
Harada et al.

(10) Patent No.: US 7,758,932 B2
(45) Date of Patent: *Jul. 20, 2010

(54) LIQUID CRYSTAL DISPLAY DEVICE AND DISPLAY APPARATUS

(75) Inventors: Shigeyuki Harada, Shizuoka (JP); Tsunehisa Kimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 12/133,531

(22) Filed: Jun. 5, 2008

(65) Prior Publication Data

US 2008/0305280 A1    Dec. 11, 2008

(30) Foreign Application Priority Data

Jun. 7, 2007   (JP)  ............... 2007-151561
May 28, 2008  (JP)  ............... 2008-139559

(51) Int. Cl.
*G02F 1/1337*   (2006.01)
*G02F 1/1333*   (2006.01)
*C09K 19/32*    (2006.01)
*C09K 19/54*    (2006.01)
*C09K 19/58*    (2006.01)

(52) U.S. Cl. .................. 428/1.2; 428/1.23; 349/123; 349/131; 349/182; 252/299.01; 252/299.5; 252/299.62

(58) Field of Classification Search .............. 252/299.4, 252/299.5, 299.62, 299.01; 428/1.2, 1.23; 349/123, 131, 182
See application file for complete search history.

(56) References Cited

U.S. PATENT DOCUMENTS 6,693,621 B1   2/2004   Hayakawa et al.

(Continued)

FOREIGN PATENT DOCUMENTS

JP   2001-100209   4/2001

(Continued)

*Primary Examiner*—Shean C Wu
(74) *Attorney, Agent, or Firm*—Cooper & Dunham LLP

(57) ABSTRACT

A disclosed liquid crystal display device includes a liquid crystal composition contained in a cell having a liquid crystal alignment film. The liquid crystal alignment film has a lamellar structure and includes at least one type of a triphenylene compound (I) represented by general formula (1):

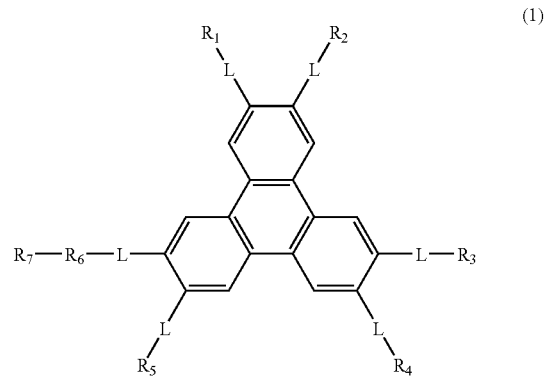

In general formula (1), L represents —O— or —S—; $R_1$, $R_2$, $R_3$, $R_4$, and $R_5$ represent the same or different hydrocarbon radicals with 4 or more carbon atoms; $R_6$ represents a divalent hydrocarbon radical with 4 or more carbon atoms; and $R_7$ represents —$SiR_8R_9R_{10}$ or —P(=O)(OH)$_2$ where $R_8$, $R_9$, and $R_{10}$ each individually represents —Cl, —OH, —OCH$_3$, or —OC$_2$H$_5$.

4 Claims, 12 Drawing Sheets

U.S. PATENT DOCUMENTS

| | | |
|---|---|---|
| 6,816,146 B2 | 11/2004 | Harada et al. |
| 7,658,979 B2 * | 2/2010 | Harada ........................ 428/1.2 |
| 2008/0194441 A1 * | 8/2008 | Kawata et al. .............. 508/208 |
| 2008/0231785 A1 * | 9/2008 | Harada ........................ 349/123 |

FOREIGN PATENT DOCUMENTS

| | | |
|---|---|---|
| JP | 2001-194654 | 7/2001 |
| JP | 2001-305549 | 10/2001 |
| JP | 2001-311080 | 11/2001 |
| JP | 2002-323701 | 11/2002 |
| JP | 2003-114437 | 4/2003 |
| JP | 2003-295194 | 10/2003 |
| JP | 2005-91738 | 4/2005 |
| JP | 2005-164828 | 6/2005 |
| JP | 2005-164829 | 6/2005 |
| JP | 2005-164830 | 6/2005 |
| JP | 2006-516757 | 7/2006 |
| JP | 2006-251592 | 9/2006 |
| JP | 2006-251593 | 9/2006 |
| JP | 2006-251606 | 9/2006 |
| JP | 2006-251612 | 9/2006 |
| JP | 2007191404 A * | 8/2007 |
| WO | WO 2004/067623 A2 | 8/2004 |

* cited by examiner

LIQUID CRYSTAL DISPLAY DEVICE AND DISPLAY APPARATUS

BACKGROUND

1. Technical Field

This disclosure generally relates to a liquid crystal display device and a display apparatus including the liquid crystal display device.

2. Description of the Related Art

Twisted nematic liquid crystal display devices are widely used as a type of liquid crystal display device. Meanwhile, vertical alignment liquid crystal display devices having advantages in terms of viewing angle dependence and the contrast ratio are being actively developed. In a vertical alignment liquid crystal display device, liquid crystal molecules having a negative dielectric anisotropy are aligned perpendicular to a substrate and are driven parallel to the substrate by applying a voltage.

Patent documents 1 through 4 disclose methods of aligning liquid crystal molecules perpendicular to a substrate using a liquid crystal alignment film made of polyimide and formed on an indium tin oxide (ITO) layer on a glass substrate. In the disclosed methods, a vertical alignment film is formed by applying a solution of polyamic acid dissolved in an organic solvent to a substrate using, for example, a spinner, imidizing the polyamic acid by heating the solution at a temperature between 120° C. and 250° C., and rubbing the film of the solution using, for example, felt to give it a vertical alignment property.

Patent document 5 discloses a non-rubbing method of aligning liquid crystal molecules perpendicular to a substrate using a polyimide resin as a non-rubbing vertical alignment material. In this method, a vertical alignment film is formed by applying polyamic acid to a substrate by spinning, pre-calcining the substrate at 100° C. for 30 minutes, and imidizing the polyamic acid by calcining the substrate at 250° C. for an hour.

Patent document 6 discloses still another method of forming a vertical alignment film using a liquid crystal alignment agent comprising polyamic acid and having a conjugated enone structure. In this method, a solution of the alignment agent dissolved in an organic solvent is applied to a substrate using, for example, a spinner, the substrate is heated at a temperature between 150 and 250° C. to imidize the alignment agent, and then the film of the solution is irradiated by ultraviolet rays with a wavelength between 320 and 450 nm to give it a vertical alignment property.

[Patent document 1] Japanese Patent Application Publication No. 2001-305549
[Patent document 2] Japanese Patent Application Publication No. 2001-311080
[Patent document 3] Japanese Patent Application Publication No. 2002-323701
[Patent document 4] Japanese Patent Application Publication No. 2003-295194
[Patent document 5] Japanese Patent Application Publication No. 2006-516757
[Patent document 6] Japanese Patent Application Publication No. 2003-114437

However, with the above methods, it is difficult to form a uniform liquid crystal alignment film on an irregular surface of a substrate covered with thin-film transistors (TFTs) and wiring because it is difficult to evenly apply a solution to the substrate surface.

Also with the above methods, because the substrate is heated at a temperature between 120 and 250° C. after a solution is applied, it is not possible to use a versatile flexible plastic film as the substrate instead of a glass substrate.

Also, the vertical alignment property of a vertical alignment film given by a rubbing method tends to become uneven because it is difficult to evenly rub an irregular surface of the substrate, and accordingly, the uneven vertical alignment property disturbs the liquid crystal alignment.

Further, a rubbing method, where an alignment film is rubbed with a cloth, tends to generate static electricity and dust that may damage TFTs and cause a display defect.

BRIEF SUMMARY

In an aspect of this disclosure, there is provided a liquid crystal display device that embodies the present invention, as discussed infra, and a display apparatus including the liquid crystal display device.

In an embodiment, a liquid crystal display device includes a liquid crystal composition contained in a cell having a liquid crystal alignment film. The liquid crystal alignment film has a lamellar structure and includes at least one type of a triphenylene compound (I) represented by general formula (1):

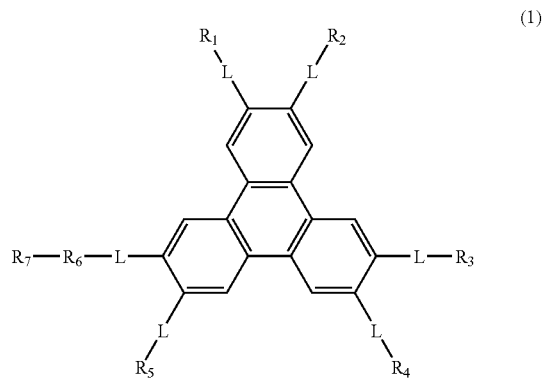

wherein L represents —O— or —S—; $R_1$, $R_2$, $R_3$, $R_4$, and $R_5$ represent the same or different hydrocarbon groups with 4 or more carbon atoms; $R_6$ represents a divalent hydrocarbon radical with 4 or more carbon atoms; and $R_7$ represents —$SiR_8R_9R_{10}$ or —P(=O)(OH)$_2$ where $R_8$, $R_9$, and $R_{10}$ each individually represents —Cl, —OH, —OCH$_3$, or —OC$_2$H$_5$.

DESCRIPTION OF THE PREFERRED EMBODIMENTS

Figure 1:
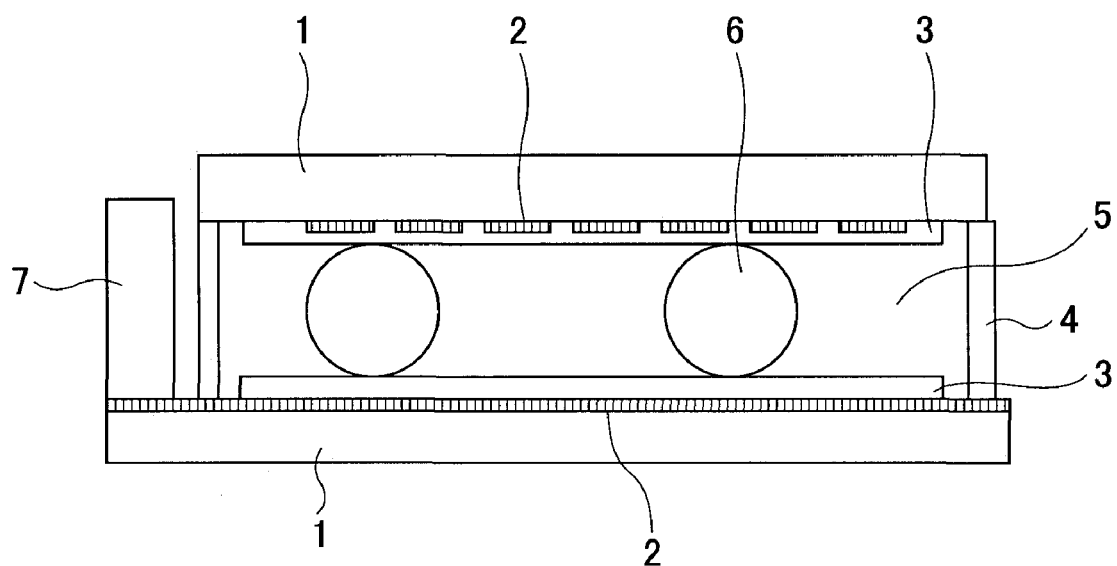
FIG. 1 is a cut-away side view of an exemplary liquid crystal display device according to an embodiment of the present invention.

Preferred embodiments of the present invention are described below with reference to the accompanying drawings.

According to an embodiment of the present invention, a liquid crystal display device comprises a liquid crystal composition contained in a cell having a liquid crystal alignment film. The liquid crystal alignment film has a lamellar structure and includes at least one type of a triphenylene compound (I) represented by general formula (1) below.

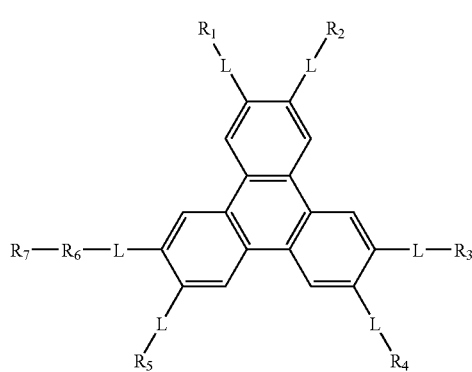

(1)

(In the above formula, L represents —O— or —S—; $R_1$, $R_2$, $R_3$, $R_4$, and $R_5$ represent the same or different hydrocarbon radicals with 4 or more carbon atoms; $R_6$ represents a divalent hydrocarbon radical with 4 or more carbon atoms; and $R_7$ represents —$SiR_8R_9R_{10}$ or —P(=O) (OH)$_2$ where $R_8$, $R_9$, and $R_{10}$ each individually represents —Cl, —OH, —OCH$_3$, or —OC$_2$H$_5$.)

Forming a liquid crystal alignment film including at least one type of the triphenylene compound (I) represented by general formula (1) makes it possible to prevent disturbance of liquid crystal alignment and thereby to prevent display defects of a liquid crystal display device. Further, forming a lamellar structure (which is a type of a layer structure where plate-like structural units aggregate regularly (Iwanami Rikagaku Jiten, Fifth Edition)) with a high orientation order by controlling the alignment of molecules forming the liquid crystal alignment film makes it possible to provide a liquid crystal display device with high liquid crystal alignment stability.

The triphenylene compound (I) represented by general formula (1) includes an adsorption portion represented by the substituent $R_7$ which is chemically or physically adsorbed to a transparent electrode of, for example, ITO formed on a glass substrate or a plastic film substrate; and an alignment control portion, i.e., a triphenylene portion having substituents $R_1$-L-, $R_2$-L-, $R_3$-L-, $R_4$-L-, $R_5$-L-, and —$R_6$-L-, which "π-π stacks" in a direction parallel to the substrate surface (i.e., the triphenylene group aligns perpendicular to the substrate) to form a stable structure and thereby controls the alignment of liquid crystal molecules.

The substituent $R_7$ forming the adsorption portion represents —$SiR_8R_9R_{10}$ or —P(=O) (OH)$_2$ where $R_8$, $R_9$, and $R_{10}$ each individually represents —Cl, —OH, —OCH$_3$, or —OC$_2$H$_5$, and can be chemically or physically adsorbed to a transparent electrode of, for example, ITO formed on a glass substrate or a plastic film substrate.

A liquid crystal alignment film having a lamellar structure and including at least one type of the triphenylene compound (I) represented by general formula (1) may be formed by chemically or physically adsorbing the adsorption portion of general formula (1) to a transparent electrode of, for example, ITO formed on a glass substrate or a plastic film substrate under a magnetic field that is parallel or perpendicular to the substrate. The triphenylene portion of general formula (1) has a planar structure and has a tendency to align parallel to a magnetic field. Therefore, as the adsorption portions of molecules are adsorbed to the substrate, the triphenylene portions of the molecules align parallel to the magnetic field and are π-π stacked with each other. As a result, the molecules are densely packed and a lamellar structure is formed. The magnetic field is preferably applied for one or more hours at two T (tesla) or higher. More preferably, the magnetic field is applied for two or more hours at four T or higher.

The substituents $R_1$, $R_2$, $R_3$, $R_4$, and $R_5$ of the alignment control portion represent the same or different hydrocarbon radicals with 4 or more carbon atoms. With hydrocarbon radicals having 3 or less carbon atoms, it is not possible to achieve a good vertical alignment property. Examples of hydrocarbon radicals for the substituents $R_1$, $R_2$, $R_3$, $R_4$, and $R_5$ include butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl (icosyl), heneicosyl (henicosyl), docosyl, tricosyl, tetracosyl, pentacosyl, hexacosyl, heptacosyl, octacosyl, nonacosyl, and triacontyl. Preferably, hydrocarbon radicals with 4 to 12 carbon atoms are used for the substituents $R_1$, $R_2$, $R_3$, $R_4$, and $R_5$.

The substituent $R_6$ represents a divalent radical of a hydrocarbon with 4 or more carbon atoms which hydrocarbon may be the same as or different from $R_1$, $R_2$, $R_3$, $R_4$, and $R_5$. Examples of divalent hydrocarbon radicals for the substituent $R_6$ include butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, eicosylene (icosylene), heneicosylene (henicosylene), docosylene, tricosylene, tetracosylene, pentacosylene, hexacosylene, heptacosylene, octacosylene, nonacosylene, and triacontylene. Preferably, hydrocarbon radicals with 8 to 18 carbon atoms are used for the substituent $R_6$. To effectively adsorb the substituent $R_7$ to the substrate, the number of carbon atoms of the hydrocarbon radical for the substituent $R_6$ is preferably larger than that of the adjacent substituent $R_5$.

A liquid crystal alignment film composition of this embodiment may comprise multiple triphenylene compounds (I) represented by general formula (1). In such a case, to make the distance between the triphenylene portions and the substrate constant and thereby to achieve a good vertical alignment property, it is preferable to use hydrocarbon radicals with the same number of carbon atoms as the substituents $R_6$ of the triphenylene compounds (I).

The triphenylene compound (I) represented by general formula (1) may be prepared as shown by formulas below regardless of the linking groups L and the substituents $R_1$ through $R_6$ used.

Examples of triphenylene compounds (I) represented by general formula (1) are shown below.

No. 1-8: [18-(3,6,7,10,11-pentakisbutyl(oxy or thio)triphenylene-2-yl(oxy or thio))-octadecyl]-phosphonic acid No. 1: [18-(3,6,7,10,11-pentakisbutyloxytriphenylene-2-yloxy)-octadecyl]-phosphonic acid No. 2: [18-(3,6,7,10,11-pentakisbutyloxytriphenylene-2-ylthio)-octadecyl]-phosphonic acid No. 3: [18-(3,6,7,10,11-pentakisbutylthiotriphenylene-2-yloxy)-octadecyl]-phosphonic acid No. 4: [18-(3,6,7,10,11-pentakisbutylthiotriphenylene-2-ylthio)-octadecyl]-phosphonic acid No. 5: [18-(3,6,7,10,11-pentakispentyloxytriphenylene-2-yloxy)-octadecyl]-phosphonic acid No. 6: [18-(3,6,7,10,11-pentakispentyloxytriphenylene-2-ylthio)-octadecyl]-phosphonic acid No. 7: [18-(3,6,7,10,11-pentakispentylthiotriphenylene-2-yloxy)-octadecyl]-phosphonic acid

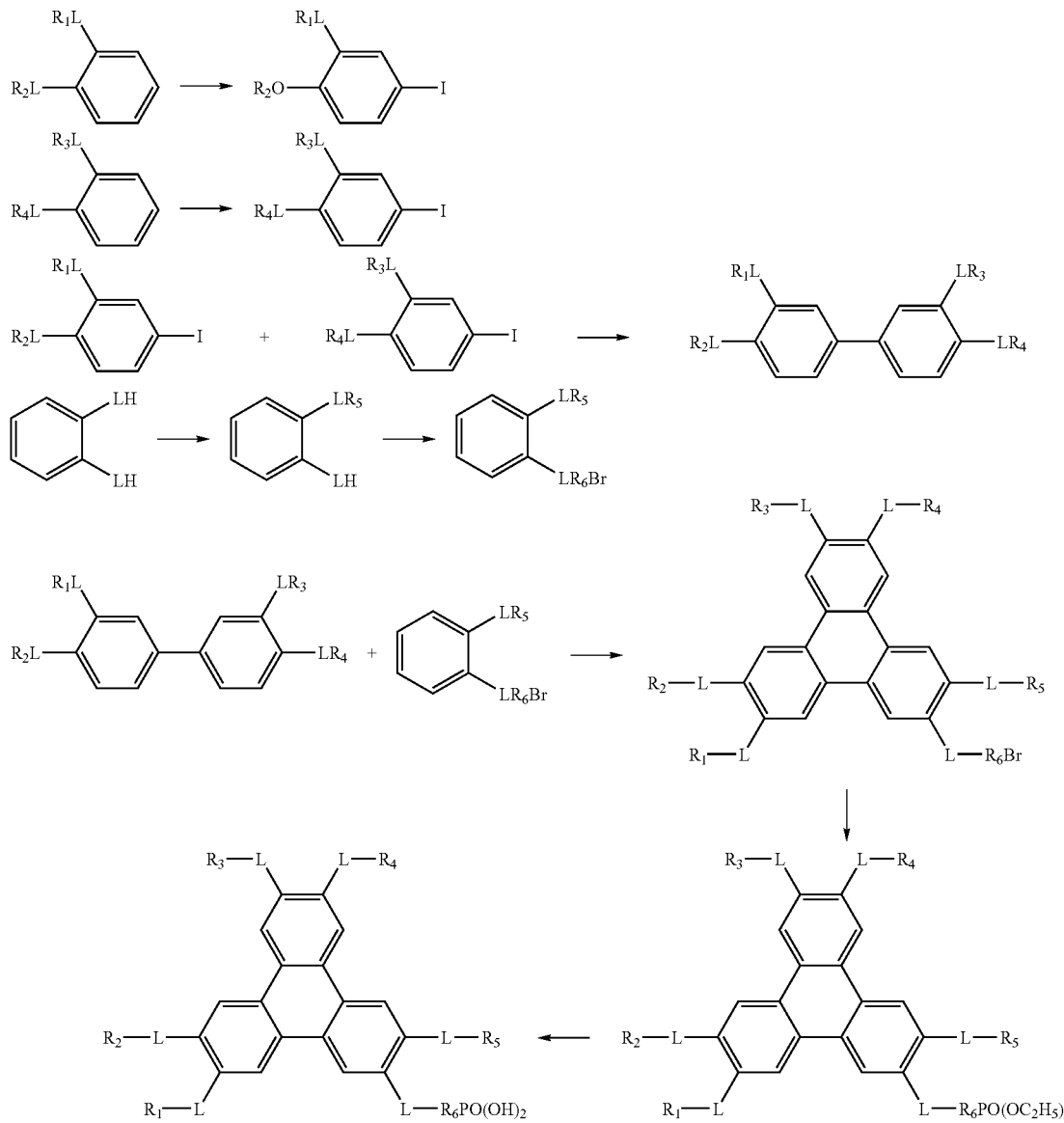

No. 8: [18-(3,6,7,10,11-pentakispentylthiotriphenylene-2-ylthio)-octadecyl]-phosphonic acid No. 9-12: [18-(3,6,7,10,11-pentakishexyl(oxy or thio)triphenylene-2-yl(oxy or thio))-octadecyl]-phosphonic acid No. 13-16: [18-(3,6,7,10,11-pentakisheptyl(oxy or thio)triphenylene-2-yl(oxy or thio))-octadecyl]-phosphonic acid No. 17-20: [18-(3,6,7,10,11-pentakisoctyl(oxy or thio)triphenylene-2-yl(oxy or thio))-octadecyl]-phosphonic acid No. 21-24: [18-(3,6,7,10,11-pentakisnonyl(oxy or thio)triphenylene-2-yl(oxy or thio))-octadecyl]-phosphonic acid No. 25-28: [18-(3,6,7,10,11-pentakisdecyl(oxy or thio)triphenylene-2-yl(oxy or thio))-octadecyl]-phosphonic acid No. 29-32: [18-(3,6,7,10,11-pentakisundecyl(oxy or thio)triphenylene-2-yl(oxy or thio))-octadecyl]-phosphonic acid No. 33-36: [18-(3,6,7,10,11-pentakisdodecyl(oxy or thio)triphenylene-2-yl(oxy or thio))-octadecyl]-phosphonic acid No. 37-40: [18-(3,6,7,10,11-pentakistridecyl(oxy or thio)triphenylene-2-yl(oxy or thio))-octadecyl]-phosphonic acid No. 41-44: [18-(3,6,7,10,11-pentakistetradecyl(oxy or thio)triphenylene-2-yl(oxy or thio))-octadecyl]-phosphonic acid No. 45-48: [16-(3,6,7,10,11-pentakisbutyl(oxy or thio)triphenylene-2-yl(oxy or thio))-hexadecyl]-phosphonic acid No. 49-52: [16-(3,6,7,10,11-pentakispentyl(oxy or thio)triphenylene-2-yl(oxy or thio))-hexadecyl]-phosphonic acid No. 53-56: [16-(3,6,7,10,11-pentakishexyl(oxy or thio)triphenylene-2-yl(oxy or thio))-hexadecyl]-phosphonic acid No. 57-60: [16-(3,6,7,10,11-pentakisheptyl(oxy or thio)triphenylene-2-yl(oxy or thio))-hexadecyl]-phosphonic acid No. 61-64: [16-(3,6,7,10,11-pentakisoctyl(oxy or thio)triphenylene-2-yl(oxy or thio))-hexadecyl]-phosphonic acid No. 65-68: [16-(3,6,7,10,11-pentakisnonyl(oxy or thio)triphenylene-2-yl(oxy or thio))-hexadecyl]-phosphonic acid No. 69-72: [16-(3,6,7,10,11-pentakisdecyl(oxy or thio)triphenylene-2-yl(oxy or thio))-hexadecyl]-phosphonic acid No. 73-76: [16-(3,6,7,10,11-pentakisundecyl(oxy or thio)triphenylene-2-yl(oxy or thio))-hexadecyl]-phosphonic acid No. 77-80: [16-(3,6,7,10,11-pentakisdodecyl(oxy or thio)triphenylene-2-yl(oxy or thio))-hexadecyl]-phosphonic acid No. 81-84: [14-(3,6,7,10,11-pentakisbutyl(oxy or thio)triphenylene-2-yl(oxy or thio))-tetradecyl]-phosphonic acid No. 85-88: [14-(3,6,7,10,11-pentakispentyl(oxy or thio)triphenylene-2-yl(oxy or thio))-tetradecyl]-phosphonic acid No. 89-92: [14-(3,6,7,10,11-pentakishexyl(oxy or thio)triphenylene-2-yl(oxy or thio))-tetradecyl]-phosphonic acid No. 93-96: [14-(3,6,7,10,11-pentakisheptyl(oxy or thio)triphenylene-2-yl(oxy or thio))-tetradecyl]-phosphonic acid No. 97-100: [14-(3,6,7,10,11-pentakisoctyl(oxy or thio)triphenylene-2-yl(oxy or thio))-tetradecyl]-phosphonic acid No. 101-104: [14-(3,6,7,10,11-pentakisnonyl(oxy or thio)triphenylene-2-yl(oxy or thio))-tetradecyl]-phosphonic acid No. 105-108: [14-(3,6,7,10,11-pentakisdecyl(oxy or thio)triphenylene-2-yl(oxy or thio))-tetradecyl]-phosphonic acid No. 109-112: [12-(3,6,7,10,11-pentakisbutyl(oxy or thio)triphenylene-2-yl(oxy or thio))-tetradecyl]-phosphonic acid No. 113-116: [12-(3,6,7,10,11-pentakispentyl(oxy or thio)triphenylene-2-yl(oxy or thio))-dodecyl]-phosphonic acid No. 117-120: [12-(3,6,7,10,11-pentakishexyl(oxy or thio)triphenylene-2-yl(oxy or thio))-dodecyl]-phosphonic acid No. 121-124: [12-(3,6,7,10,11-pentakisheptyl(oxy or thio)triphenylene-2-yl(oxy or thio))-dodecyl]-phosphonic acid No. 125-128: [12-(3,6,7,10,11-pentakisoctyl(oxy or thio)triphenylene-2-yl(oxy or thio))-dodecyl]-phosphonic acid No. 129-132: [11-(3,6,7,10,11-pentakisbutyl(oxy or thio)triphenylene-2-yl(oxy or thio))-undecyl]-phosphonic acid No. 133-136: [11-(3,6,7,10,11-pentakispentyl(oxy or thio)triphenylene-2-yl(oxy or thio))-undecyl]-phosphonic acid No. 137-140: [11-(3,6,7,10,11-pentakishexyl(oxy or thio)triphenylene-2-yl(oxy or thio))-undecyl]-phosphonic acid No. 141-144: [11-(3,6,7,10,11-pentakisheptyl(oxy or thio)triphenylene-2-yl(oxy or thio))-undecyl]-phosphonic acid No. 145-148: [8-(3,6,7,10,11-pentakisbutyl(oxy or thio)triphenylene-2-yl(oxy or thio))-octyl]-phosphonic acid No. 149-152: [8-(3,6,7,10,11-pentakispentyl(oxy or thio)triphenylene-2-yl(oxy or thio))-octyl]-phosphonic acid No. 153-176: [18-(3,6,7,10,11-pentakisbutyl(oxy or thio)triphenylene-2-yl(oxy or thio))-octadecyl]-tri(chloro, methoxy, or ethoxy)silane No. 153: [18-(3,6,7,10,11-pentakisbutyloxytriphenylene-2-yloxy)-octadecyl]-trichlorosilane No. 154: [18-(3,6,7,10,11-pentakisbutyloxytriphenylene-2-yloxy)-octadecyl]-trimethoxysilane No. 155: [18-(3,6,7,10,11-pentakisbutyloxytriphenylene-2-yloxy)-octadecyl]-triethoxysilane No. 156: [18-(3,6,7,10,11-pentakisbutyloxytriphenylene-2-ylthio)-octadecyl]-trichlorosilane No. 157: [18-(3,6,7,10,11-pentakisbutyloxytriphenylene-2-ylthio)-octadecyl]-trimethoxysilane No. 158: [18-(3,6,7,10,11-pentakisbutyloxytriphenylene-2-ylthio)-octadecyl]-triethoxysilane No. 159: [18-(3,6,7,10,11-pentakisbutylthiotriphenylene-2-yloxy)-octadecyl]-trichlorosilane No. 160: [18-(3,6,7,10,11-pentakisbutylthiotriphenylene-2-yloxy)-octadecyl]-trimethoxysilane No. 161: [18-(3,6,7,10,11-pentakisbutylthiotriphenylene-2-yloxy)-octadecyl]-triethoxysilane No. 162: [18-(3,6,7,10,11-pentakisbutylthiotriphenylene-2-ylthio)-octadecyl]-trichlorosilane No. 163: [18-(3,6,7,10,11-pentakisbutylthiotriphenylene-2-ylthio)-octadecyl]-trimethoxysilane No. 164: [18-(3,6,7,10,11-pentakisbutylthiotriphenylene-2-ylthio)-octadecyl]-triethoxysilane No. 165: [18-(3,6,7,10,11-pentakispentyloxytriphenylene-2-yloxy)-octadecyl]-trichlorosilane No. 166: [18-(3,6,7,10,11-pentakispentyloxytriphenylene-2-yloxy)-octadecyl]-trimethoxysilane No. 167: [18-(3,6,7,10,11-pentakispentyloxytriphenylene-2-yloxy)-octadecyl]-triethoxysilane No. 168: [18-(3,6,7,10,11-pentakispentyloxytriphenylene-2-ylthio)-octadecyl]-trichlorosilane No. 169: [18-(3,6,7,10,11-pentakispentyloxytriphenylene-2-ylthio)-octadecyl]-trimethoxysilane No. 170: [18-(3,6,7,10,11-pentakispentyloxytriphenylene-2-ylthio)-octadecyl]-triethoxysilane No. 171: [18-(3,6,7,10,11-pentakispentylthiotriphenylene-2-yloxy)-octadecyl]-trichlorosilane No. 172: [18-(3,6,7,10,11-pentakispentylthiotriphenylene-2-yloxy)-octadecyl]-trimethoxysilane No. 173: [18-(3,6,7,10,11-pentakispentylthiotriphenylene-2-yloxy)-octadecyl]-triethoxysilane No. 174: [18-(3,6,7,10,11-pentakispentylthiotriphenylene-2-ylthio)-octadecyl]-trichlorosilane No. 175: [18-(3,6,7,10,11-pentakispentylthiotriphenylene-2-ylthio)-octadecyl]-trimethoxysilane No. 176: [18-(3,6,7,10,11-pentakispentylthiotriphenylene-2-ylthio)-octadecyl]-triethoxysilane No. 177-188: [18-(3,6,7,10,11-pentakishexyl(oxy or thio) triphenylene-2-yl(oxy or thio))-octadecyl]-tri(chloro, methoxy, or ethoxy)silane No. 189-200: [18-(3,6,7,10,11-pentakisheptyl(oxy or thio) triphenylene-2-yl(oxy or thio))-octadecyl]-tri(chloro, methoxy, or ethoxy)silane No. 201-212: [18-(3,6,7,10,11-pentakisoctyl(oxy or thio) triphenylene-2-yl(oxy or thio))-octadecyl]-tri(chloro, methoxy, or ethoxy)silane No. 213-224: [18-(3,6,7,10,11-pentakisnonyl(oxy or thio) triphenylene-2-yl(oxy or thio))-octadecyl]-tri(chloro, methoxy, or ethoxy)silane No. 225-236: [18-(3,6,7,10,11-pentakisdecyl(oxy or thio) triphenylene-2-yl(oxy or thio))-octadecyl]-tri(chloro, methoxy, or ethoxy)silane No. 237-248: [18-(3,6,7,10,11-pentakisundecyl(oxy or thio) triphenylene-2-yl(oxy or thio))-octadecyl]-tri(chloro, methoxy, or ethoxy)silane No. 249-260: [18-(3,6,7,10,11-pentakisdodecyl(oxy or thio) triphenylene-2-yl(oxy or thio))-octadecyl]-tri(chloro, methoxy, or ethoxy)silane No. 261-272: [18-(3,6,7,10,11-pentakistridecyl(oxy or thio) triphenylene-2-yl(oxy or thio))-octadecyl]-tri(chloro, methoxy, or ethoxy)silane No. 273-284: [18-(3,6,7,10,11-pentakistetradecyl(oxy or thio)triphenylene-2-yl(oxy or thio))-octadecyl]-tri(chloro, methoxy, or ethoxy)silane No. 285-296: [16-(3,6,7,10,11-pentakisbutyl(oxy or thio) triphenylene-2-yl(oxy or thio))-hexadecyl]-tri(chloro, methoxy, or ethoxy)silane No. 297-308: [16-(3,6,7,10,11-pentakispentyl(oxy or thio) triphenylene-2-yl(oxy or thio))-hexadecyl]-tri(chloro, methoxy, or ethoxy)silane No. 309-320: [16-(3,6,7,10,11-pentakishexyl(oxy or thio) triphenylene-2-yl(oxy or thio))-hexadecyl]-tri(chloro, methoxy, or ethoxy)silane No. 321-332: [16-(3,6,7,10,11-pentakisheptyl(oxy or thio) triphenylene-2-yl(oxy or thio))-hexadecyl]-tri(chloro, methoxy, or ethoxy)silane No. 333-344: [16-(3,6,7,10,11-pentakisoctyl(oxy or thio) triphenylene-2-yl(oxy or thio))-hexadecyl]-tri(chloro, methoxy, or ethoxy)silane No. 345-356: [16-(3,6,7,10,11-pentakisnonyl(oxy or thio) triphenylene-2-yl(oxy or thio))-hexadecyl]-tri(chloro, methoxy, or ethoxy)silane No. 357-368: [16-(3,6,7,10,11-pentakisdecyl(oxy or thio) triphenylene-2-yl(oxy or thio))-hexadecyl]-tri(chloro, methoxy, or ethoxy)silane No. 369-380: [16-(3,6,7,10,11-pentakisundecyl(oxy or thio) triphenylene-2-yl(oxy or thio))-hexadecyl]-tri(chloro, methoxy, or ethoxy)silane No. 381-392: [16-(3,6,7,10,11-pentakisdodecyl(oxy or thio) triphenylene-2-yl(oxy or thio))-hexadecyl]-tri(chloro, methoxy, or ethoxy)silane No. 393-414: [14-(3,6,7,10,11-pentakisbutyl(oxy or thio) triphenylene-2-yl(oxy or thio))-tetradecyl]-tri(chloro, methoxy, or ethoxy)silane No. 415-426: [14-(3,6,7,10,11-pentakispentyl(oxy or thio) triphenylene-2-yl(oxy or thio))-tetradecyl]-tri(chloro, methoxy, or ethoxy)silane No. 427-438: [14-(3,6,7,10,11-pentakishexyl(oxy or thio) triphenylene-2-yl(oxy or thio))-tetradecyl]-tri(chloro, methoxy, or ethoxy)silane No. 439-450: [14-(3,6,7,10,11-pentakisheptyl(oxy or thio) triphenylene-2-yl(oxy or thio))-tetradecyl]-tri(chloro, methoxy, or ethoxy)silane No. 451-462: [14-(3,6,7,10,11-pentakisoctyl(oxy or thio) triphenylene-2-yl(oxy or thio))-tetradecyl]-tri(chloro, methoxy, or ethoxy)silane No. 463-474: [14-(3,6,7,10,11-pentakisnonyl(oxy or thio) triphenylene-2-yl(oxy or thio))-tetradecyl]-tri(chloro, methoxy, or ethoxy)silane No. 475-486: [14-(3,6,7,10,11-pentakisdecyl(oxy or thio) triphenylene-2-yl(oxy or thio))-tetradecyl]-tri(chloro, methoxy, or ethoxy)silane No. 487-498: [12-(3,6,7,10,11-pentakisbutyl(oxy or thio) triphenylene-2-yl(oxy or thio))-dodecyl]-tri(chloro, methoxy, or ethoxy)silane No. 499-510: [12-(3,6,7,10,11-pentakispentyl(oxy or thio) triphenylene-2-yl(oxy or thio))-dodecyl]-tri(chloro, methoxy, or ethoxy)silane No. 511-522: [12-(3,6,7,10,11-pentakishexyl(oxy or thio) triphenylene-2-yl(oxy or thio))-dodecyl]-tri(chloro, methoxy, or ethoxy)silane No. 523-534: [12-(3,6,7,10,11-pentakisheptyl(oxy or thio) triphenylene-2-yl(oxy or thio))-dodecyl]-tri(chloro, methoxy, or ethoxy)silane No. 535-546: [12-(3,6,7,10,11-pentakisoctyl(oxy or thio) triphenylene-2-yl(oxy or thio))-dodecyl]-tri(chloro, methoxy, or ethoxy)silane No. 547-558: [11-(3,6,7,10,11-pentakisbutyl(oxy or thio) triphenylene-2-yl(oxy or thio))-undecyl]-tri(chloro, methoxy, or ethoxy)silane No. 559-570: [11-(3,6,7,10,11-pentakispentyl(oxy or thio) triphenylene-2-yl(oxy or thio))-undecyl]-tri(chloro, methoxy, or ethoxy)silane No. 571-582: [11-(3,6,7,10,11-pentakishexyl(oxy or thio) triphenylene-2-yl(oxy or thio))-undecyl]-tri(chloro, methoxy, or ethoxy)silane No. 583-594: [11-(3,6,7,10,11-pentakisheptyl(oxy or thio) triphenylene-2-yl(oxy or thio))-undecyl]-tri(chloro, methoxy, or ethoxy)silane No. 595-606: [8-(3,6,7,10,11-pentakisbutyl(oxy or thio) triphenylene-2-yl(oxy or thio))-octyl]-tri(chloro, methoxy, or ethoxy)silane No. 607-618: [8-(3,6,7,10,11-pentakispentyl(oxy or thio) triphenylene-2-yl(oxy or thio))-octyl]-tri(chloro, methoxy, or ethoxy)silane A liquid crystal display device using a liquid crystal alignment film according to an embodiment of the present invention may be produced by soaking a glass substrate or a plastic substrate with electrodes made of, for example, ITO in a liquid crystal alignment film composition as described above, washing and drying the substrate to form an alignment film on the ITO, disposing a pair of the substrates such that the electrode sides of the substrates face each other, spacing the electrode sides at a constant distance from each other using a spacer to form a cell, and injecting a liquid crystal composition into the cell. Known compositions may be used as the liquid crystal composition. Any liquid crystal composition may be used regardless of its dielectric constant anisotropy.

FIG. 1 is a cut-away side view of an exemplary liquid crystal display device according to an embodiment of the present invention. The exemplary liquid crystal display device includes substrates 1, electrodes 2, liquid crystal alignment films 3, a sealant 4, a liquid crystal composition 5, spacers 6, and a drive circuit 7. The exemplary liquid crystal display device may also include an optical film such as a polarizing plate or a reflector plate depending on the display method.

According to an embodiment of the present invention, a liquid crystal display device comprises a liquid crystal composition contained in a cell having a liquid crystal alignment film that has a lamellar structure and includes at least one type of the triphenylene compound (I) represented by general formula (1). According to another embodiment of the present invention, the liquid crystal composition includes a chiral dopant and at least one type of a triphenylene compound (II) represented by general formula (2) below.

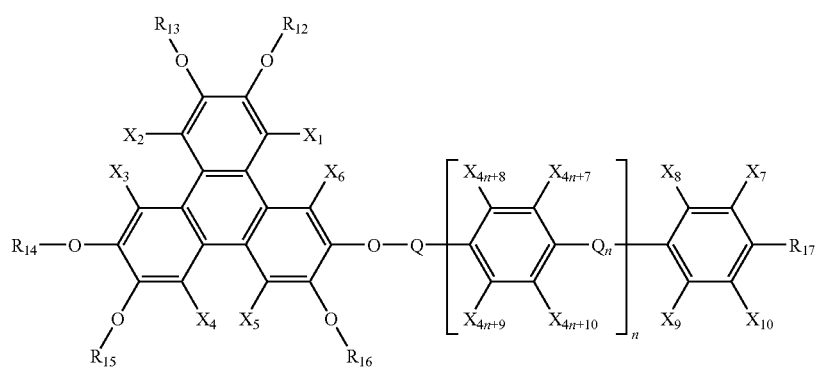

(2)

(In the above formula, $R_{12}$, $R_{13}$, $R_{14}$, $R_{15}$, and $R_{16}$ represent the same or different hydrocarbon radicals with 4 or more carbon atoms; $R_{17}$ represents alkyl, alkoxy, or alkoxycarbonyl with 3 or more carbon atoms; $X_1$, $X_2$, $X_3$, $X_4$, $X_5$, $X_6$, $X_7$, $X_8$, $X_9$, $X_{10}$, $X_{4n+7}$, $X_{4n+8}$, $X_{4n+9}$, and $X_{4n+10}$ each represents a hydrogen atom, a fluorine atom, or a chlorine atom where n represents an integer not smaller than 1; Q represents a divalent radical with 4 or more carbon atoms which divalent radical has —C(=O)—, —O—, —C(=O)—O—, or —O—C(=O) at one end or both ends; and $Q_n$ represents —C(=O)—O— or —O—C(=O)—.)

The triphenylene compound (II) represented by general formula (2), which is included in the liquid crystal composition of a liquid crystal display device of this embodiment, includes a discotic liquid crystalline triphenylene portion and a calamitic liquid crystalline aromatic ester portion shaped like a rod.

The disk surface of the discotic liquid crystalline triphenylene portion aligns parallel to a normal of the alignment film plane because of interaction with the alignment film surface triphenylene existing on the top surface of the liquid crystal alignment film comprising the triphenylene compound (I) represented by general formula (1). Therefore, the calamitic liquid crystalline aromatic ester portion can align in directions parallel and approximately perpendicular to the normal of the alignment film plane. Accordingly, the liquid crystal composition in the liquid crystal display device can exhibit homeotropic alignment, a cholesteric phase where the helical axes of molecules uniformly align parallel to the substrate surface, or an alignment that is intermediate between the homeotropic alignment and the cholesteric phase.

Any known chiral dopant may be used for the liquid crystal composition. The chiral dopant induces a twist in the alignment of liquid crystal molecules. By adding a chiral dopant to a liquid crystal composition including at least one type of the triphenylene compound (II) represented by general formula (2), the liquid crystal composition exhibits bistability where both the homeotropic alignment and the cholesteric phase are stable.

Also, using a liquid crystal alignment film having a lamellar structure and including at least one type of the triphenylene compound (I) represented by general formula (1) enables the triphenylene portion of the triphenylene compound (II) represented by general formula (2) to stably align according to the lamellar structure and thereby improves the bistability.

Thus, a liquid crystal display device of this embodiment, which comprises a cell having a liquid crystal alignment film having a lamellar structure and including at least one type of the triphenylene compound (I) represented by general formula (1), and a liquid crystal composition contained in the cell and including a chiral dopant and at least one type of the triphenylene compound (II) represented by general formula (2), can maintain liquid crystal alignment without consuming electric power and is therefore usable for various display apparatuses such as electronic paper.

To achieve the unique bistability described above, in one gram of the liquid crystal composition, the amount of the triphenylene compound (II) represented by general formula (2) is preferably between 1 and 100 μmol and the amount of the chiral dopant is preferably such that the helical pitch becomes 80 to 135% of the cell thickness. More preferably, in one gram of the liquid crystal composition, the amount of the triphenylene compound (II) represented by general formula (2) is between 5 and 50 μmol, and the amount of the chiral dopant is such that the helical pitch becomes 90 to 120% of the cell thickness.

In general formula (2), $R_{12}$, $R_{13}$, $R_{14}$, $R_{15}$, and $R_{16}$ represent the same or different hydrocarbon radicals with 4 or more carbon atoms. With hydrocarbon radicals having 3 or less carbon atoms, the discotic liquid crystalline triphenylene portion may aggregate in the liquid crystal composition and/or the disk surface of the discotic liquid crystalline triphenylene portion may not align parallel to the normal of the alignment film plane, and therefore, the liquid crystal composition may not exhibit bistability. Examples of hydrocarbon radicals for the substituents $R_{12}$, $R_{13}$, $R_{14}$, $R_{15}$, and $R_{16}$ include butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl (icosyl), heneicosyl (henicosyl), docosyl, tricosyl, tetracosyl, pentacosyl, hexacosyl, heptacosyl, octacosyl, nonacosyl, and triacontyl. Preferably, hydrocarbon radicals with 4 to 12 carbon atoms are used for the substituents $R_{12}$, $R_{13}$, $R_{14}$, $R_{15}$, and $R_{16}$.

The substituents $X_1$, $X_2$, $X_3$, $X_4$, $X_5$, and $X_6$ of the discotic liquid crystalline triphenylene portion each represents a hydrogen atom, a fluorine atom, or a chlorine atom.

The substituents $X_7$, $X_8$, $X_9$, $X_{10}$, $X_{4n+7}$, $X_{4n+8}$, $X_{4n+9}$, and $X_{4n+10}$ of the rod-like calamitic liquid crystalline aromatic ester portion each represents a hydrogen atom, a fluorine atom, or a chlorine atom where n represents an integer not smaller than 1. When at least one of the substituents $X_7$, $X_8$, $X_9$, $X_{10}$, $X_{4n+7}$, $X_{4n+8}$, $X_{4n+9}$, and $X_{4n+10}$ is a fluorine atom or preferably a chlorine atom, the triphenylene compound (II) represented by general formula (2) exhibits dual frequency characteristics. In other words, the rod-like calamitic liquid crystalline aromatic ester portion shows a positive dielectric constant anisotropy under a voltage with a low frequency of several kHz or lower and shows a negative dielectric constant anisotropy under a voltage with a high frequency of several 10 kHz or higher. Therefore, it is possible to switch between the bistable conditions, the cholesteric phase and the homeotropic alignment, by changing the frequency of a voltage to be applied.

Q is a linking group between the discotic liquid crystalline triphenylene portion and the calamitic liquid crystalline aromatic ester portion and represents a divalent radical with 4 or more carbon atoms which divalent radical has —C(=O), —O, —C(=O)—O, or —O—C(=O) at one end or both ends. For example, Q represents any one of the following divalent radicals the right end of which is bonded to the calamitic liquid crystalline aromatic ester portion:

- —C(=O)—(CH$_2$)$_S$—C(=O)— (s represents an integer not smaller than 2)
- —C(=O)—(CH$_2$)$_S$—C(=O)—O— (s represents an integer not smaller than 2)
- —C(=O)—(CH$_2$)$_S$—O—C(=O)— (s represents an integer not smaller than 2)
- —C(=O)—(CH$_2$)$_t$—O— (t represents an integer not smaller than 3)
- —C(=O)—(CH$_2$)$_t$— (t represents an integer not smaller than 3)
- —(CH$_2$)$_t$—C(=O)— (t represents an integer not smaller than 3)
- —(CH$_2$)$_t$—C(=O)—O— (t represents an integer not smaller than 3)
- —(CH$_2$)$_t$—O—C(=O)— (t represents an integer not smaller than 3)
- —(CH$_2$)$_u$—O— (u represents an integer not smaller than 4)
- —(CH$_2$)$_u$— (u represents an integer not smaller than 4)

If the linking group is too long, the electric field response is reduced. Therefore, s is preferably between 2 and 14, t is preferably between 3 and 15, and u is preferably between 4 and 16.

$Q_n$ of the calamitic liquid crystalline aromatic ester portion represents —C(=O)—O— or —O—C(=O)— where n represents an integer not smaller than 1. The compatibility of the calamitic liquid crystalline aromatic ester portion with the liquid crystal composition is reduced as its molecular weight increases. Therefore, n is preferably between 1 and 6, and more preferably between 1 and 3.

$R_{17}$ represents alkyl, alkoxy, or alkoxycarbonyl with 3 or more carbon atoms. Examples of the substituent $R_{17}$ include alkyl groups such as propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl (icosyl), heneicosyl (henicosyl), docosyl, tricosyl, tetracosyl, pentacosyl, hexacosyl, heptacosyl, octacosyl, nonacosyl, and triacontyl; alkyloxy groups such as propyloxy, butyloxy, pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, eicosyloxy (icosyloxy), heneicosyloxy (henicosyloxy), docosyloxy, tricosyloxy, tetracosyloxy, pentacosyloxy, hexacosyloxy, heptacosyloxy, octacosyloxy, nonacosyloxy, and triacontyloxy; and alkyloxycarbonyl groups such as propyloxycarbonyl, butyloxycarbonyl, pentyloxycarbonyl, hexyloxycarbonyl, heptyloxycarbonyl, octyloxycarbonyl, nonyloxycarbonyl, decyloxycarbonyl, undecyloxycarbonyl, dodecyloxycarbonyl, tridecyloxycarbonyl, tetradecyloxycarbonyl, pentadecyloxycarbonyl, hexadecyloxycarbonyl, heptadecyloxycarbonyl, octadecyloxycarbonyl, nonadecyloxycarbonyl, eicosyloxycarbonyl (icosyloxycarbonyl), heneicosyloxycarbonyl (henicosyloxycarbonyl), docosyloxycarbonyl, tricosyloxycarbonyl, tetracosyloxycarbonyl, pentacosyloxycarbonyl, hexacosyloxycarbonyl, heptacosyloxycarbonyl, octacosyloxycarbonyl, nonacosyloxycarbonyl, and triacontyloxycarbonyl. Preferably, alkyl, alkoxy, or alkoxycarbonyl with 3 to 12 carbon atoms are used for the substituent $R_{17}$.

The triphenylene compound (II) represented by general formula (2) may be prepared as shown by formulas below.

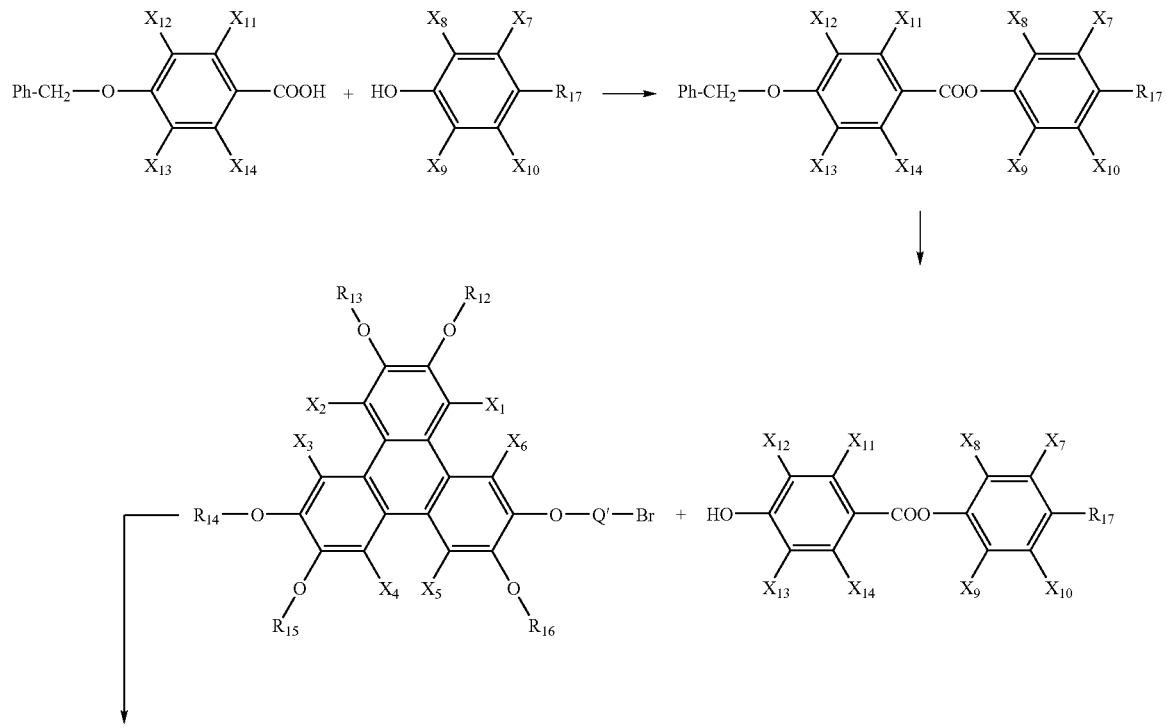

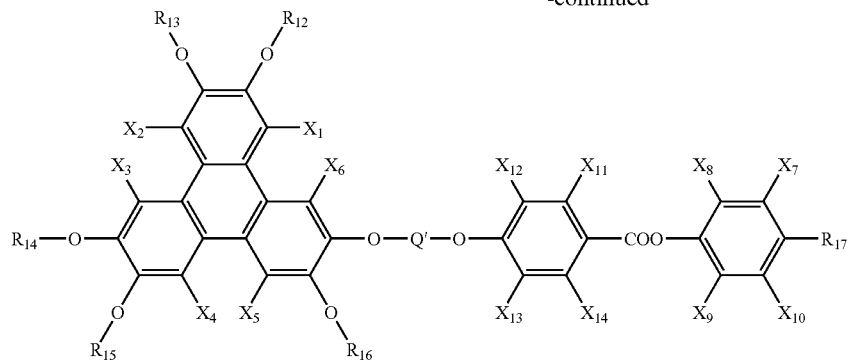

-continued

Examples of triphenylene compounds (II) represented by general formula (2) are shown below.

No. 1000-1039: (2 or 3)-(chloro or fluoro)-4-[4-(3,6,7,10,11-pentabutoxy-triphenylene-2-yloxy)butoxy]-benzoic acid 4-(propyl, butyl, pentyl, hexyl, heptyl, octyl, nonyl, decyl, undecyl, or dodecyl)-phenyl ester No. 1000-1009: 2-chloro-4-[4-(3,6,7,10,11-pentabutoxy-triphenylene-2-yloxy)butoxy]-benzoic acid 4-(propyl, butyl, pentyl, hexyl, heptyl, octyl, nonyl, decyl, undecyl, or dodecyl)-phenyl ester No. 1010-1019: 2-fluoro-4-[4-(3,6,7,10,11-pentabutoxy-triphenylene-2-yloxy)butoxy]-benzoic acid 4-(propyl, butyl, pentyl, hexyl, heptyl, octyl, nonyl, decyl, undecyl, or dodecyl)-phenyl ester No. 1020-1019: 3-chloro-4-[4-(3,6,7,10,11-pentabutoxy-triphenylene-2-yloxy)butoxy]-benzoic acid 4-(propyl, butyl, pentyl, hexyl, heptyl, octyl, nonyl, decyl, undecyl, or dodecyl)-phenyl ester No. 1030-1039: 3-fluoro-4-[4-(3,6,7,10,11-pentabutoxy-triphenylene-2-yloxy)butoxy]-benzoic acid 4-(propyl, butyl, pentyl, hexyl, heptyl, octyl, nonyl, decyl, undecyl, or dodecyl)-phenyl ester No. 1040-1439: (2 or 3)-(chloro or fluoro)-4-[4-, 5-, 6-, 7-, 8-, 9-, 10-, 11-, 12-, 13-, or 14-(3,6,7,10,11-pentabutoxy-triphenylene-2-yloxy)-(pentyl, hexyl, heptyl, octyl, nonyl, decyl, undecyl, dodecyl, tridecyl, or tetradecyl)oxy]-benzoic acid 4-(propyl, butyl, pentyl, hexyl, heptyl, octyl, nonyl, decyl, undecyl, or dodecyl)-phenyl ester No. 1440-1759: (2 or 3)-(chloro or fluoro)-4-[4-3,6,7,10,11-pentakis-(pentyl, hexyl, heptyl, octyl, nonyl, decyl, undecyl, dodecyl, tridecyl, or tetradecyl)oxy-triphenylene-2-yloxy)-butoxy]-benzoic acid 4-(propyl, butyl, pentyl, hexyl, heptyl, octyl, nonyl, decyl, undecyl, or dodecyl)-phenyl ester No. 1760-2559: (2 or 3)-(chloro or fluoro)-4-[4-, 5-, 6-, 7-, 8-, 9-, 10-, 11-, 12-, 13-, or 14-(3,6,7,10,11-pentakis)-(pentyl, hexyl, heptyl, octyl, nonyl, decyl, undecyl, or dodecyl)oxy-triphenylene-2-yloxy)-(pentyl, hexyl, heptyl, octyl, nonyl, decyl, undecyl, dodecyl, tridecyl, or tetradecyl)oxy]-benzoic acid 4-(propyl, butyl, pentyl, hexyl, heptyl, octyl, nonyl, decyl, undecyl, or dodecyl)-phenyl ester No. 2560-2599: (2 or 3)-(chloro or fluoro)-4-[4-(3,6,7,10,11-pentabutoxy-triphenylene-2-yloxy)-butoxy]-benzoic acid 4-(4-(propyl, butyl, pentyl, hexyl, heptyl, octyl, nonyl, decyl, undecyl, or dodecyl)-phenoxycarbonyl)-phenyl ester No. 2600-2999: (2 or 3)-(chloro or fluoro)-4-[4-, 5-, 6-, 7-, 8-, 9-, 10-, 11-, 12-, 13-, or 14-(3,6,7,10,11-pentabutoxy-triphenylene-2-yloxy)-(pentyl, hexyl, heptyl, octyl, nonyl, decyl, undecyl, dodecyl, tridecyl, or tetradecyl)oxy]-benzoic acid 4-(4-(propyl, butyl, pentyl, hexyl, heptyl, octyl, nonyl, decyl, undecyl, or dodecyl)-phenoxycarbonyl)-phenyl ester No. 3000-3399: (2 or 3)-(chloro or fluoro)-4-[4-(3,6,7,10,11-pentakis)-(pentyl, hexyl, heptyl, octyl, nonyl, decyl, undecyl, dodecyl, tridecyl, or tetradecyl)oxy-triphenylene-2-yloxy)-butoxy]-benzoic acid 4-(4-(propyl, butyl, pentyl, hexyl, heptyl, octyl, nonyl, decyl, undecyl, or dodecyl)-phenoxycarbonyl)-phenyl ester No. 3400-3799: (2 or 3)-(chloro or fluoro)-4-[4-, 5-, 6-, 7-, 8-, 9-, 10-, 11-, 12-, 13-, or 14-(3,6,7,10,11-pentakis)-(pentyl, hexyl, heptyl, octyl, nonyl, decyl, undecyl, dodecyl, tridecyl, or tetradecyl)oxy-triphenylene-2-yloxy)-(pentyl, hexyl, heptyl, octyl, nonyl, decyl, undecyl, dodecyl, tridecyl, or tetradecyl)oxy]-benzoic acid 4-(4-(propyl, butyl, pentyl, hexyl, heptyl, octyl, nonyl, decyl, undecyl, or dodecyl)-phenoxycarbonyl)-phenyl ester No. 3800-4199: (2 or 3)-(chloro or fluoro)-4-{4-[4-(3,6,7,10,11-pentabutoxy-triphenylene-2-yloxy)-butoxy]-benzoyloxy}-benzoic acid 4-(propyl, butyl, pentyl, hexyl, heptyl, octyl, nonyl, decyl, undecyl, or dodecyl)-phenyl ester No. 4200-4599: (2 or 3)-(chloro or fluoro)-4-{4-[4-, 5-, 6-, 7-, 8-, 9-, 10-, 11-, 12-, 13-, or 14-(3,6,7,10,11-pentabutoxy-triphenylene-2-yloxy)-(pentyl, hexyl, heptyl, octyl, nonyl, decyl, undecyl, dodecyl, tridecyl, or tetradecyl)oxy]-benzoyloxy}-benzoic acid 4-(propyl, butyl, pentyl, hexyl, heptyl, octyl, nonyl, decyl, undecyl, or dodecyl)-phenyl ester No. 4600-4999: (2 or 3)-(chloro or fluoro)-4-{4-[4-(3,6,7,10,11-pentakis-(pentyl, hexyl, heptyl, octyl, nonyl, decyl, undecyl, dodecyl, tridecyl, or tetradecyl)oxy-triphenylene-2-yloxy)-butoxy]-benzoyloxy}-benzoic acid 4-(propyl, butyl, pentyl, hexyl, heptyl, octyl, nonyl, decyl, undecyl, or dodecyl)-phenyl ester No. 5000-5399: (2 or 3)-(chloro or fluoro)-4-{4-[4-, 5-, 6-, 7-, 8-, 9-, 10-, 11-, 12-, 13-, or 14-(3,6,7,10,11-pentakis)-(pentyl, hexyl, heptyl, octyl, nonyl, decyl, undecyl, dodecyl, tridecyl, or tetradecyl)oxy-triphenylene-2-yloxy)-(pentyl, hexyl, heptyl, octyl, nonyl, decyl, undecyl, dodecyl, tridecyl, or tetradecyl)oxy]-benzoyloxy}-benzoic acid 4-(propyl, butyl, pentyl, hexyl, heptyl, octyl, nonyl, decyl, undecyl, or dodecyl)-phenyl ester No. 5400-5799: (2 or 3)-(chloro or fluoro)-4-[4-(3,6,7,10,11-pentabutoxy-triphenylene-2-yloxy)-(butyryl, pentanoyl, hexanoyl, heptanoyl, octanoyl, nonanoyl, decanoyl, undecanoyl, or dodecanoyl)oxy]-benzoic acid 4-(4-propyl, butyl, pentyl, hexyl, heptyl, octyl, nonyl, decyl, undecyl, or dodecyl)-phenoxycarbonyl)-phenyl ester No. 5800-6199: (2 or 3)-(chloro or fluoro)-4-[4-, 5-, 6-, 7-, 8-, 9-, 10-, 11-, 12-, 13-, or 14-(3,6,7,10,11-pentakis-(pentyl, hexyl, heptyl, octyl, nonyl, decyl, undecyl, dodecyl, tridecyl, or tetradecyl)oxy-triphenylene-2-yloxy)-(butyryl, pentanoyl, hexanoyl, heptanoyl, octanoyl, nonanoyl, decanoyl, undecanoyl, or dodecanoyl)oxy]-benzoic acid 4-(4-(propyl, butyl, pentyl, hexyl, heptyl, octyl, nonyl, decyl, undecyl, or dodecyl)-phenoxycarbonyl)-phenyl ester A dichromatic dye may be added to the liquid crystal composition including a chiral dopant and the triphenylene compound (II) represented by general formula (2). Adding a dichromatic dye makes it possible to display different colors in the cholesteric phase and the homeotropic alignment that are both stable. Any known dichromatic dye may be used for this purpose.

The liquid crystal display device of this embodiment may be used as a part or whole of various types of display apparatuses.

For example, the liquid crystal display device of this embodiment may be used as a part or whole of a small card such as a credit card, a reward card, and a membership card to display information. The liquid crystal display device of this embodiment may also be used to implement a display apparatus used in offices as a substitute for a conventional display or recording medium (printout from a copier, a printer, etc.). A display apparatus including such a bistable memory liquid crystal display device can maintain a displayed image without consuming electric power and therefore has an advantage in terms of resource and energy savings. Also, the liquid crystal display device of this embodiment may be incorporated in various apparatuses such as home electric appliances to provide information instead of a conventional liquid crystal monitor. Further, the liquid crystal display device of this embodiment may be used for advertisements. For example, the liquid crystal display device may be used to implement the entirety of an advertising sign or may be incorporated as a part of a poster. The liquid crystal display device of this embodiment may be implemented as a flexible display medium by, for example, using a flexible substrate. Therefore, the liquid crystal display device of this embodiment can take various shapes and can be used for a wide variety of purposes including those described above.

EXAMPLES

Below, embodiments of the present invention are described in more detail with examples.

Synthesis Example 1

Synthesis of Compound No. 53: [16-(3,6,7,10,11-pentakishexyloxytriphenylene-2-yloxy)-hexadecyl]-phosphonic acid (a compound represented by general formula (1) where $R_1$ through $R_5$ are hexyl, R6 is hexadecylene, and $R_7$ is —P(=O) (OH)$_2$)

Synthesis of 1,2-bishexyloxy-4-iodobenzene

To 750 mL of glacial acetic acid, 69.3 g (253 mmol) of iodine, 32.8 g (144 mmol) of periodic acid, 150 mL of distilled water, and 22.5 mL of concentrated sulfuric acid were added. The resulting mixture was stirred at ambient temperature for five minutes, and 80.00 g (287 mmol) of 1,2-dihexyloxybenzene was added. Then, the mixture was stirred at 40° C. for 24 hours. The obtained reaction mixture was cooled to ambient temperature, washed with a KOH aqueous solution (1 M, 1.5 L) and 3 L of distilled water, and extracted with 800 mL of chloroform. The organic phase was dried over MgSO$_4$ and the solvent was evaporated. The residue was purified by column chromatography and was then distilled. As a result, 218.6 g of a light brown liquid was obtained.

Synthesis of 3,4,3',4'-tetrakishexyloxybiphenyl

A mixture of 1200 mL of distilled water/acetone (1/1), 194 g of Pd/C (Pd: 10%), 194 g of zinc powder, and 200 g (495 mmol) of 1,2-bishexyloxy-4-iodobenzene was stirred at 50° C. for 24 hours. The resulting reaction mixture was filtered with a glass filter and extracted with chloroform. The organic phase was washed with distilled water and dried over MgSO$_4$. Then, the solvent was evaporated and 123 g of a yellow solid was obtained. The yellow solid was recrystallized from ethanol and 58.5 g of a white solid was obtained.

Synthesis of 2-hexyloxyphenol

A mixture of 740 mL of methyl ethyl ketone, 120 g (1.09 mol) of catechol, 178 g (1.09 mmol) of 1-bromohexane, and 211 g (1.53 mol, 1.4 eq.) of potassium carbonate was refluxed for 25 hours. After being cooled, the mixture was filtered and the solvent was evaporated. The residue of 202 g was purified by silica-gel column chromatography and was then distilled. As a result, 101 g of a transparent liquid was obtained.

Synthesis of 1-(16-bromohexadecyl)-2-hexyloxybenzene

To 350 mL of dehydrated methylene chloride, 12.8 g (66 mmol) of 2-hexyloxyphenol, 23.3 g (73 mmol) of 16-bromohexadecane-1-ol, and 20.0 g (99 mmol) of tri-n-butylphosphine were added. The resulting mixture was cooled with ice under argon. After 25.0 g (99 mmol) of 1,1'-(azodicarbonyl) dipiperidine was added bit by bit while stirring the mixture, 150 mL of methylene chloride was added. Under argon, the mixture was stirred at ambient temperature for 30 minutes and was refluxed for 6 hours. After being cooled, the reaction solution was put into 100 mL of hexane and was filtered. The filtered liquid was purified by silica-gel column chromatography. As a result, 26.5 g of a transparent liquid was obtained.

Synthesis of 2-(16-bromohexadecyl)-3,6,7,10,11-pentakishexyloxytriphenylene

In 40 mL of methylene chloride, 5.70 g (10 mmol) of 3,3',4,4'-tetrakishexyloxybiphenyl and 15.3 g (31 mmol) of 1-(16-bromohexadecyl)-2-hexyloxybenzene were dissolved. Under argon, 10.0 g (62 mmol) of FeCl$_3$ was added to the solution, and the solution was stirred at ambient temperature for three hours. The resulting reaction mixture was put into 800 mL of methanol and filtered to obtain 102 g of a solid. The solid was purified by silica-gel column chromatography to obtain a yellow solid. The yellow solid was recrystallized from ethanol and 8.2 g of a white solid was obtained.

Synthesis of [16-(3,6,7,10,11-pentakishexyloxytriphenylene-2-yloxy)-hexadecyl]-phosphonic acid diethylester Under argon, 20 mL of triethyl phosphite was added to 6.1 g (5.8 mmol) of 2-(16-bromohexadecyl)-3,6,7,10,11-pentakishexyloxytriphenylene, and the mixture was stirred at 150° C. for 27 hours. Excess triethyl phosphite was evaporated from the mixture and the residue was purified by silica-gel column chromatography. As a result, 5.4 g of a white solid was obtained.

Synthesis of [16-(3,6,7,10,11-pentakishexyloxytriphenylene-2-yloxy)-hexadecyl]-phosphonic acid In 15 mL of methylene chloride, 2.0 g (1.8 mmol) of [16-(3,6,7,10,11-pentakishexyloxytriphenylene-2-yloxy)-hexadecyl]-phosphonic acid diethylester was dissolved, and 1.2 mL of trimethylsilylbromide was added to the solution under argon. Then, the solution was stirred at ambient temperature. After 27 hours, the solvent and excess trimethylsilylbromide were evaporated, and the residue was dissolved in 100 mL of ethanol. The solution was stirred at ambient temperature for 48 hours, and then the solvent was evaporated. As a result, 1.9 g of a white solid was obtained.

Synthesis Example 2

Synthesis of Compound No. 3125: 2-chloro-4-[9-(3, 6,7,10,11-pentakis-hexyloxy-triphenylene-2-yloxy)-nonanoiloxy]-benzoic acid 4-(4-pentyloxy-phenoxycarbonyl)-phenyl ester (a Compound Represented by General Formula (2))

Synthesis of 2-chloro-4-hydroxy-ethyl ester benzoate

A solution comprising 34.5 g (200 mmol) of 2-chloro-4-hydroxy-benzoic acid, 5 mL of concentrated sulfuric acid, and 400 mL of ethanol was refluxed for 18 hours. The resulting mixture was added to 1.2 L of water and was extracted with 1.5 L of methylene chloride. The extract was washed with an aqueous solution of sodium acid carbonate and water, and dried with magnesium sulfate to evaporate the solvent. The residue was recrystallized from hexane/ethyl acetate. As a result, 20.4 g of a light orange solid was obtained.

Synthesis of 4-benzyloxy-2-chloro-ethyl ester benzoate

To 100 mL of methyl ethyl ketone, 16.76 g (83.5 mmol) of 2-chloro-4-hydroxy-ethyl ester benzoate and 23.1 g (167 mmol) of potassium carbonate were added. Then, 17.1 g (100 mmol) of bromomethylbenzene was added while stirring the mixture. The mixture was refluxed for 28 hours, then cooled, and filtered. The filtered liquid was concentrated, and the residue was purified by silica-gel column chromatography. As a result, 21.1 g of a light yellow solid was obtained.

Synthesis of 4-benzyloxy-2-chloro-benzoic acid

To a mixed solvent of 180 mL of methanol and 18 mL of water, 17.7 g (60.9 mmol) of 4-benzyloxy-2-chloro-ethyl ester benzoate and 4.87 g (122 mmol) of sodium hydroxide were added, and the mixture was refluxed for 6 hours. After the mixture was cooled, concentrated hydrochloric acid was added to the mixture until its pH reached 5, and the deposit was separated by filtration. The separated deposit was washed with water and dried. As a result, 8.5 g of a white solid was obtained.

Synthesis of 4-benzyloxy-benzoic acid 4-pentyl-phenyl ester

To 150 mL of methylene chloride, 12.6 g (55.0 mmol) of 4-benzyloxy-benzoic acid, 8.2 g (50.0 mmol) of 4-pentylphenol, and 0.61 g (5.0 mmol) of 4-dimethylaminopyridine were added. Then, 11.4 g (55.0 mmol) of dicyclohexylcarbodiimide was added while stirring the mixture under argon. After being stirred for 6 hours under argon, the mixture was filtered and the filtered liquid was concentrated. The residue was purified by silica-gel column chromatography. As a result, 18.7 g of a white solid was obtained.

Synthesis of 4-hydroxy-benzoic acid 4-pentyl-phenyl ester

To 100 mL of dehydrated ethanol, 15.6 g (41.5 mmol) of 4-benzyloxy-benzoic acid 4-pentyl-phenyl ester, 25 mL of cyclohexene, and 0.78 g of palladium hydroxide/carbon were added. Then, the mixture was refluxed for 10 hours under argon. The resulting reaction mixture was filtered, and the filtered liquid was concentrated. The residue was recrystallized from toluene. As a result, 11.0 g of a white solid was obtained.

Synthesis of 4-benzyloxy-2-chloro-benzoic acid 4-(4-pentyl-phenoxycarbonyl)-phenyl ester In 50 mL of methylene chloride, 1.84 g (7.0 mmol) of 4-benzyloxy-2-chloro-benzoic acid, 1.90 g (6.7 mmol) of 4-hydroxy-benzoic acid 4-pentyl-phenyl ester, and 0.082 g (0.67 mmol) of 4-dimethylaminopyridine were dissolved. Then, 1.45 g (7.0 mmol) of dicyclohexylcarbodiimide was added while stirring the solution under argon. After being stirred for 8 hours under argon, the solution was filtered and the filtered liquid was concentrated. The residue was purified by silica-gel column chromatography. As a result, 3.3 g of a white solid was obtained.

Synthesis of 2-chloro-4-hydroxy-benzoic acid 4-(4-pentyl-phenoxycarbonyl)-phenyl ester To 25 mL of dehydrated ethanol, 2.5 g (4.7 mmol) of 4-benzyloxy-2-chloro-benzoic acid 4-(4-pentyl-phenoxycarbonyl)-phenyl ester, 20 mL of cyclohexene, and 0.13 g of palladium hydroxide/carbon were added. Then, the mixture was refluxed for 12 hours under argon. The resulting reaction mixture was filtered, and the filtered liquid was concentrated. The residue was recrystallized from hexane/ethyl acetate. As a result, 1.65 g of a white solid was obtained.

Synthesis of 2-chloro-4-[9-(3,6,7,10,11-pentakis-hexyloxy-triphenylene-2-yloxy)-nonanoiloxy]-benzoic acid 4-(4-pentyloxy-phenoxycarbonyl)-phenyl ester In 20 mL of methylene chloride, 0.70 g (0.78 mmol) of 9-(3,6,7,10,11-pentakis-hexyloxy-triphenylene-2-yloxy)-nonanoic acid, 0.34 g (0.78 mmol) of 2-chloro-4-hydroxy-benzoic acid 4-(4-pentyl-phenoxycarbonyl)-phenyl ester, and 0.009 g (0.08 mmol) of 4-dimethylaminopyridine were dissolved. Then, 0.16 g (0.78 mmol) of dicyclohexylcarbodiimide was added while stirring the solution under argon. After being stirred for 22 hours under argon, the solution was filtered and the filtered liquid was concentrated. The residue was purified by silica-gel column chromatography. As a result, 0.44 g of a white solid was obtained.

Example 1

Two ITO-coated glass substrates (SuperITO-A, ITO layer thickness: about 100 nm, ULVAC COATING CORPORATION) with a thickness of 1.1 mm were soaked in a solution of hydrogen peroxide solution (about 30%), ammonia water (about 30%), and ion-exchanged water (mixed in a ratio of 1:1:5), sonicated for about 15 minutes, and soaked in the solution at 60° C. for 60 minutes to clean the ITO surfaces.

<Formation of Liquid Crystal Alignment Film>

An alignment film composition was prepared by dissolving 5.25 mg of [16-(3,6,7,10,11-pentakishexyloxytriphenylene-2-yloxy)-hexadecyl]-phosphonic acid obtained in Synthesis Example 1 in 10 mL of ethanol. The cleaned ITO-coated glass substrates were soaked in the prepared alignment film composition, and a magnetic field having a magnetic field direction parallel to the substrate surfaces and a magnetic field strength of 8 T was applied to the ITO-coated glass substrates at ambient temperature for 24 hours. After being demagnetized, the glass substrates were taken out of the alignment film composition and dried by blowing air. Then, the glass substrates were dried at 80° C. for one hour, ultrasonic-cleaned in methanol, and dried by blowing nitrogen (at ambient temperature) to form liquid crystal alignment films on the ITO surfaces.

Figure 2:
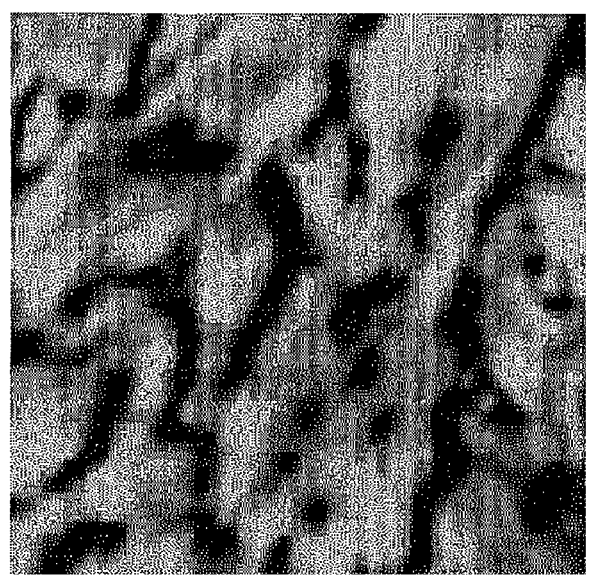
FIG. 2 is a phase image, observed by a scanning probe microscope (SPM), of a surface of an alignment film formed in Example 1, where the size is 250 μm×250 μm and the magnetic field is oriented in the vertical direction of the phase image.

The surface of each of the formed liquid crystal alignment films was observed using a scanning probe microscope (SPM) of Digital Instruments in a tapping mode. In the microscopic observation, a lamellar structure was observed as shown in FIG. 2.

<Formation of Cell and Production of Liquid Crystal Display Device>

The two ITO-coated glass substrates with the liquid crystal alignment films were disposed such that the electrode sides face each other. The electrode sides were spaced about 18 μm from each other using resin film spacers to form a cell.

The formed cell was filled with a liquid crystal composition comprising 33 mg (25 μmol) of 2-chloro-4-[9-(3,6,7,10,11-pentakis-hexyloxy-triphenylene-2-yloxy)-nonanoiloxy]-benzoic acid 4-(4-pentyloxy-phenoxycarbonyl)-phenyl ester of Synthesis Example 2 (a compound represented by general formula (2) where $R_{12}$ through $R_{16}$ are —$C_6H_{13}$; $R_{17}$ is —$C_5H_{11}$; n is 2; $X_1$ through $X_{10}$ and $X_{15}$ through $X_{18}$ are —H; $X_{14}$ is —Cl; Q is —$C_8H_{16}$COO— (the left end is bonded to the triphenylene side); $Q_1$ and $Q_2$ are —COO— (the left end is bonded to the triphenylene side)) dissolved in 1 g of RDP-95407 (DIC Corporation). The liquid crystal composition was heated to a temperature (112° C.) at which it exhibits an isotropic phase and then cooled to ambient temperature. Then, the gap between the substrates was sealed with an adhesive to produce a liquid crystal display device.

<Evaluation of Alignment Characteristics>

Figure 3:
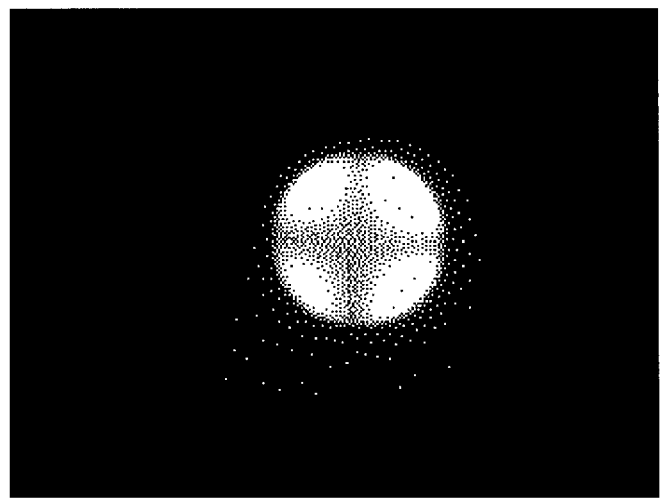
FIG. 3 is a conoscopic image of a liquid crystal display device produced in Example 1.

FIG. 3 is a conoscopic image, observed using a polarizing microscope, of the liquid crystal display device produced as described above. In FIG. 3, if the intersection of a cross is situated at the center of a circle, it indicates that the liquid crystal is vertically aligned. If the intersection of the cross deviates from the center of the circle, it indicates that the liquid crystal is tilted. A larger distance from the center indicates a larger amount of tilt. As shown in FIG. 3, the liquid crystal composition produced in Example 1 is aligned perpendicular to the substrate surface. Conoscopic images of different portions of the liquid crystal display device showed similar results. This indicates that the liquid crystal is uniformly aligned. Thus, the liquid crystal composition of Example 1 was uniformly aligned perpendicular to the substrate surface, i.e., was homeotropically aligned.

Example 2

<Formation of Cell and Production of Liquid Crystal Display Device>

A cell formed as in Example 1 was filled with a liquid crystal composition comprising 33 mg (25 μmol) of 2-chloro-4-[9-(3,6,7,10,11-pentakis-hexyloxy-triphenylene-2-yloxy)-nonanoiloxy]-benzoic acid 4-(4-pentyloxy-phenoxycarbonyl)-phenyl ester of Synthesis Example 2 (a compound represented by general formula (2) where $R_{12}$ through $R_{16}$ are —$C_6H_{13}$; $R_{17}$ is —$C_5H_{11}$; n is 2; $X_1$ through $X_{10}$ and $X_{15}$ through $X_{18}$ are —H; $X_{14}$ is —Cl; Q is —$C_8H_{16}$COO— (the left end is bonded to the triphenylene side); $Q_1$ and $Q_2$ are —COO-(the left end is bonded to the triphenylene side)) and 9 mg of chiral dopant CN (Merck Ltd., Japan) dissolved in 1 g of MX-001543 (Merck Ltd., Japan). The liquid crystal composition had a chiral pitch of 19 μm. The liquid crystal composition was heated to a temperature (112° C.) at which it exhibits an isotropic phase and then cooled to ambient temperature. Then, the gap between the substrates was sealed with an adhesive to produce a liquid crystal display device.

<Evaluation of Alignment Characteristics and Bistability>

Figure 4:
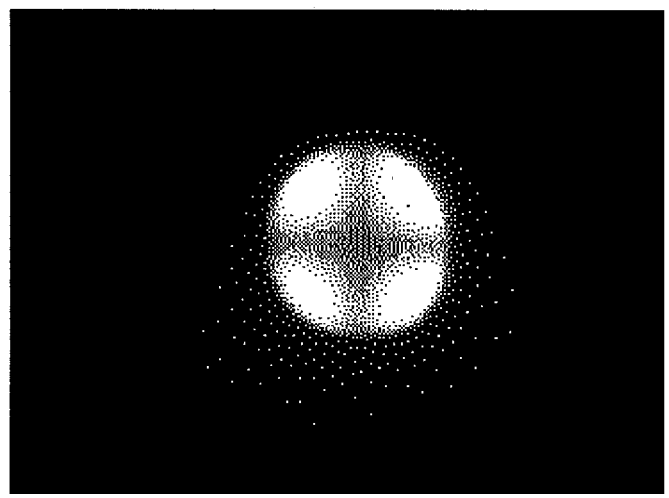
FIG. 4 is a conoscopic image of a liquid crystal display device produced in Example 2.

After alternately applying voltages of 5 V-1 kHz and 5 V-100 kHz three times to the liquid crystal display device produced as described above, a conoscopic image of the liquid crystal display device was observed using a polarizing microscope while applying a voltage of 5 V-1 kHz. FIG. 4 is a conoscopic image of the liquid crystal display device.

Figure 5:
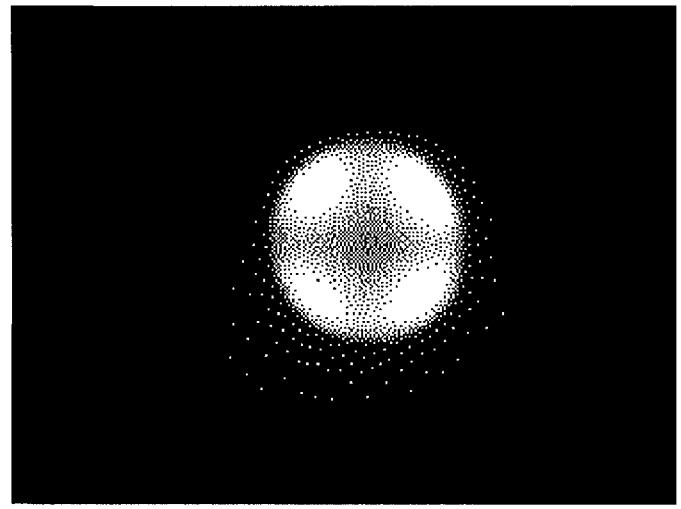
FIG. 5 is another conoscopic image of a liquid crystal display device produced in Example 2.
Figure 6:
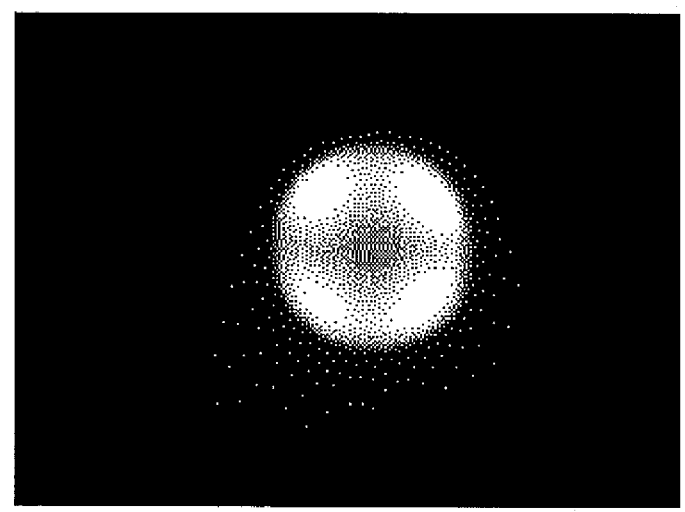
FIG. 6 is still another conoscopic image of a liquid crystal display device produced in Example 2.

The liquid crystal composition exhibited a uniform homeotropic alignment with respect to the substrate surface. Then, the voltage of 5 V-1 kHz was turned off, and conoscopic images were observed, respectively, at one hour and six hours after turning off the voltage. The results are shown in FIGS. 5 and 6. FIGS. 5 and 6 indicate that the homeotropic alignment is maintained throughout the liquid crystal composition even when no voltage is being applied.

Figure 7:
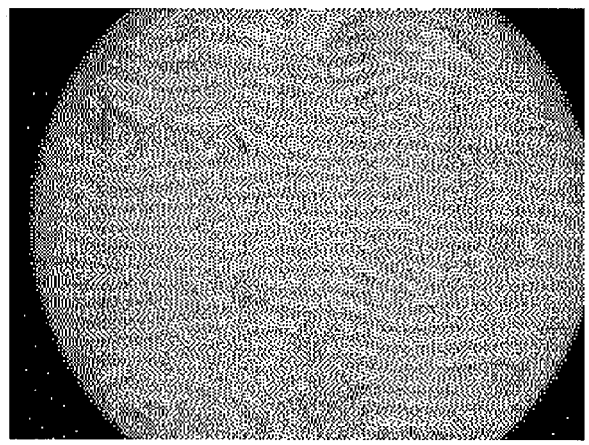
FIG. 7 is an orthoscopic image of a liquid crystal display device produced in Example 2.
Figure 8:
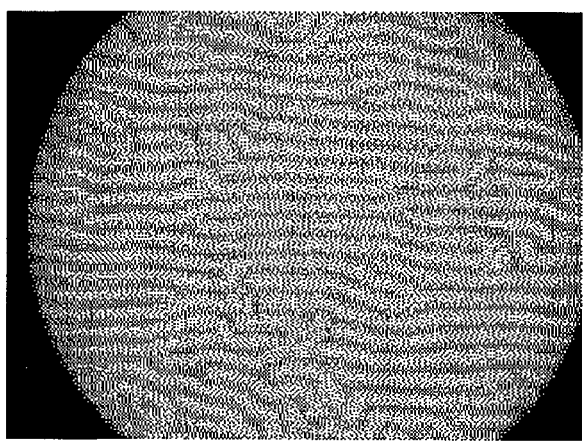
FIG. 8 is another orthoscopic image of a liquid crystal display device produced in Example 2.
Figure 9:
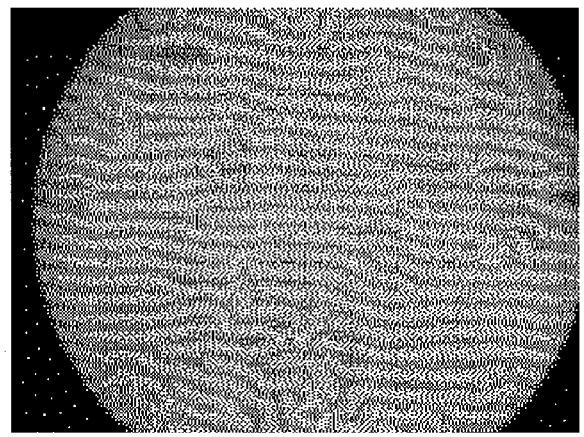
FIG. 9 is another orthoscopic image of a liquid crystal display device produced in Example 2.
Figure 10:
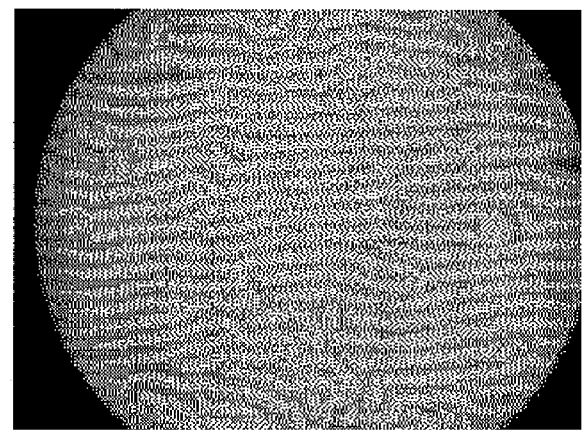
FIG. 10 is still another orthoscopic image of a liquid crystal display device produced in Example 2.

Next, after alternately applying voltages of 3 V-100 kHz and 5 V-1 kHz three times to the same liquid crystal display device, an orthoscopic image of the liquid crystal display device was observed using a polarizing microscope while applying a voltage of 3 V-100 kHz. FIG. 7 is an orthoscopic image of the liquid crystal display device. The liquid crystal composition was uniformly aligned parallel to the substrate surface, i.e., was in a cholesteric phase. Then, the voltage of 3 V-100 kHz was turned off, and orthoscopic images were observed, respectively, at 1 hour, 24 hours, and 48 hours after turning off the voltage. The results are shown in FIGS. 8, 9, and 10. FIGS. 8, 9, and 10 indicate that the cholesteric phase is maintained throughout the liquid crystal composition even when no voltage is being applied.

Thus, the liquid crystal display device of Example 2 is a bistable liquid crystal display device that can maintain the homeotropic alignment and the cholesteric phase even when no voltage is being applied.

[Reference 1]

<Formation of Liquid Crystal Alignment Film>

In Reference 1, liquid crystal alignment films were formed in a manner similar to that in Example 1 except that no magnetic field was applied to the glass substrates.

Figure 11:
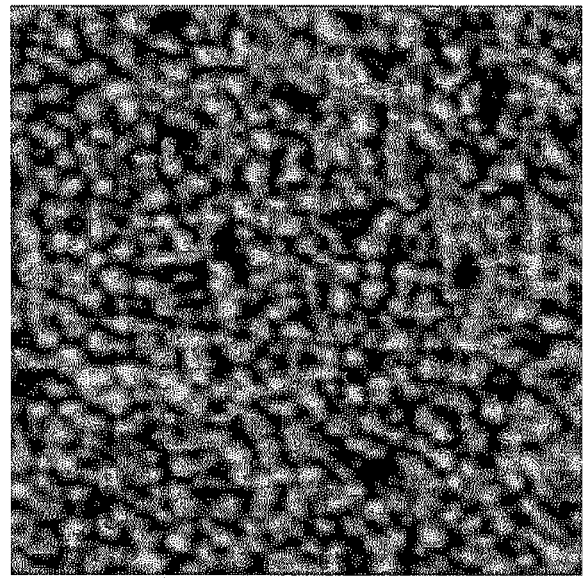
FIG. 11 is a phase image, observed by an SPM, of a surface of an alignment film formed in Reference 1, where the size is 500 μm×500 μm.

The surface of each of the formed liquid crystal alignment films was observed using a scanning probe microscope (SPM) of Digital Instruments in a tapping mode. In this case, no lamellar structure was observed as shown in FIG. 11.

<Formation of Cell and Production of Liquid Crystal Display Device>

Using the glass substrates having the above liquid crystal alignment films, a liquid crystal display device was produced in a manner similar to that in Example 2.

<Evaluation of Alignment Characteristics and Bistability>

Figure 12:
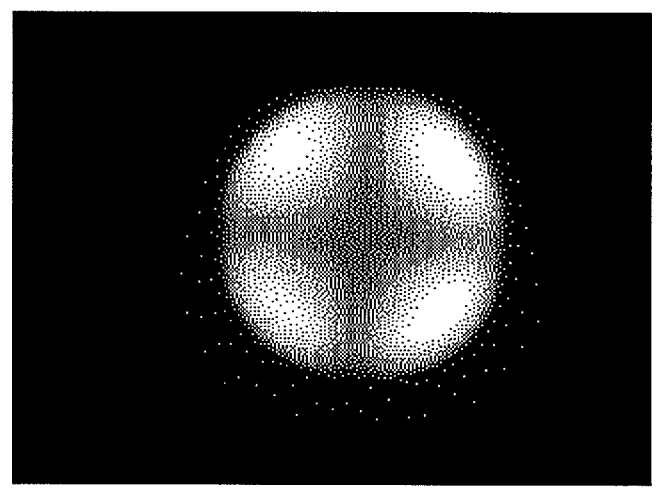
FIG. 12 is a conoscopic image of a liquid crystal display device produced in Reference 1.

After alternately applying voltages of 5 V-1 kHz and 5 V-100 kHz three times to the liquid crystal display device produced as described above, a conoscopic image of the liquid crystal display device was observed using a polarizing microscope while applying a voltage of 5 V-1 kHz. FIG. 12 is a conoscopic image of the liquid crystal display device.

Figure 13:
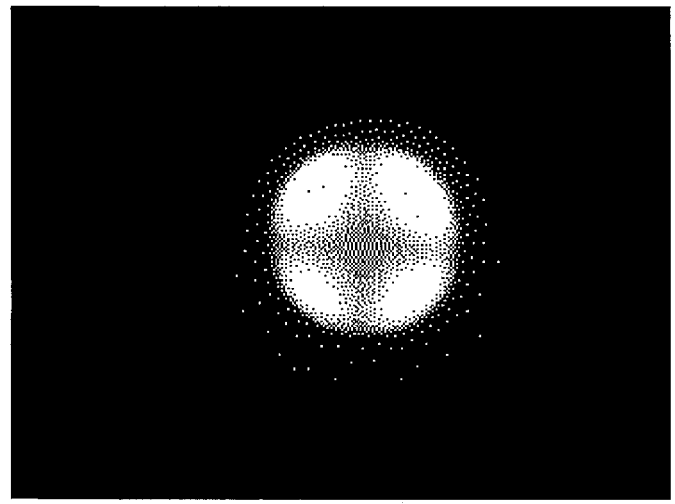
FIG. 13 is another conoscopic image of a liquid crystal display device produced in Reference 1.
Figure 14:
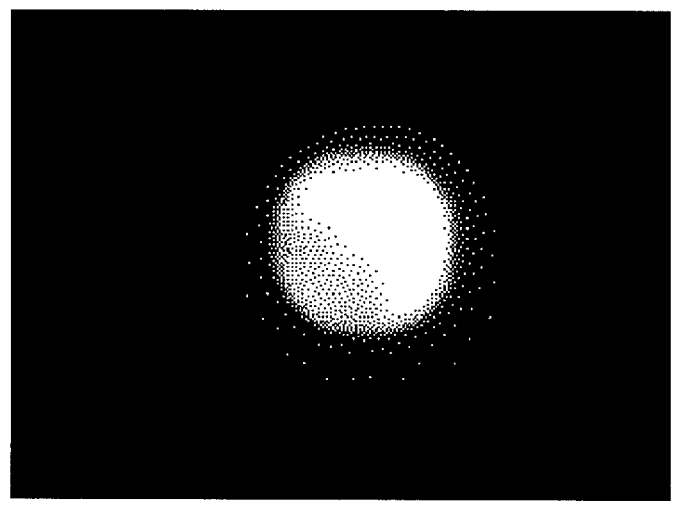
FIG. 14 is still another conoscopic image of a liquid crystal display device produced in Reference 1.
Figure 15:
FIG. 15 is an orthoscopic image of a liquid crystal display device produced in Reference 1.

The liquid crystal composition exhibited a uniform homeotropic alignment with respect to the substrate surface. Then, the voltage of 5 V-1 kHz was turned off, and conoscopic images were observed, respectively, at one hour and six hours after turning off the voltage. The results are shown in FIGS. 13 and 14. Also, at 6 hours after turning off the voltage, an orthoscopic image of the liquid crystal display device was observed. As shown in FIG. 15, a part of the liquid crystal composition changed from the homeotropic alignment to the cholesteric phase after six hours. This indicates that the memory capability of the liquid crystal display device of Reference 1 is not sufficient.

Figure 16:
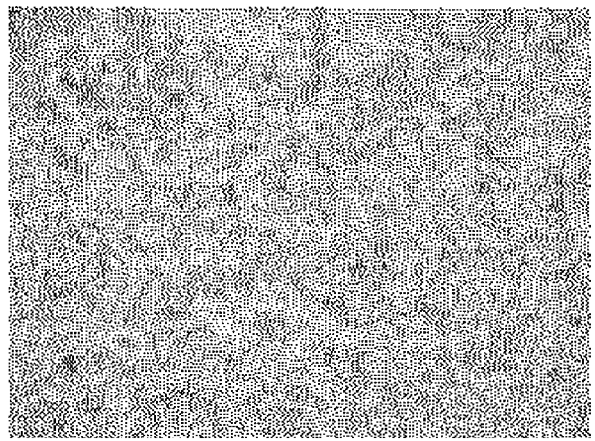
FIG. 16 is another orthoscopic image of a liquid crystal display device produced in Reference 1.
Figure 17:
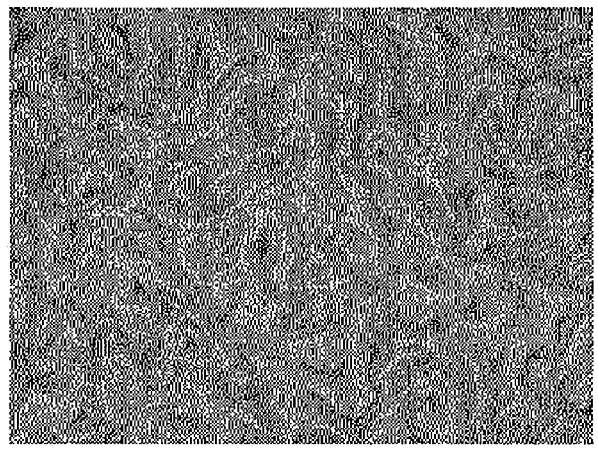
FIG. 17 is another orthoscopic image of a liquid crystal display device produced in Reference 1.
Figure 18:
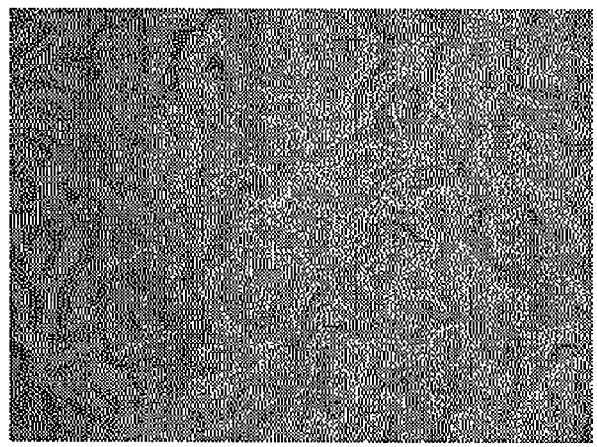
FIG. 18 is another orthoscopic image of a liquid crystal display device produced in Reference 1.
Figure 19:
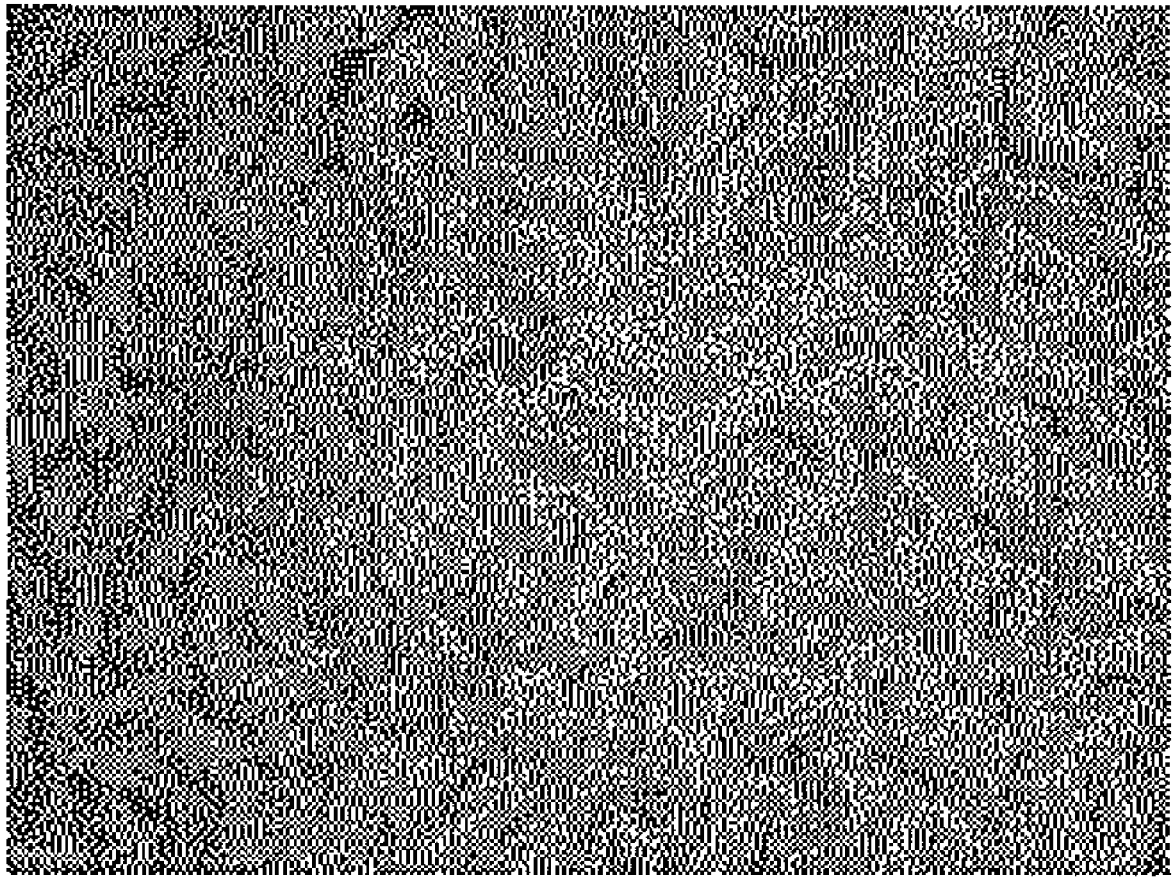
FIG. 19 is still another orthoscopic image of a liquid crystal display device produced in Reference 1.
Figure 20:
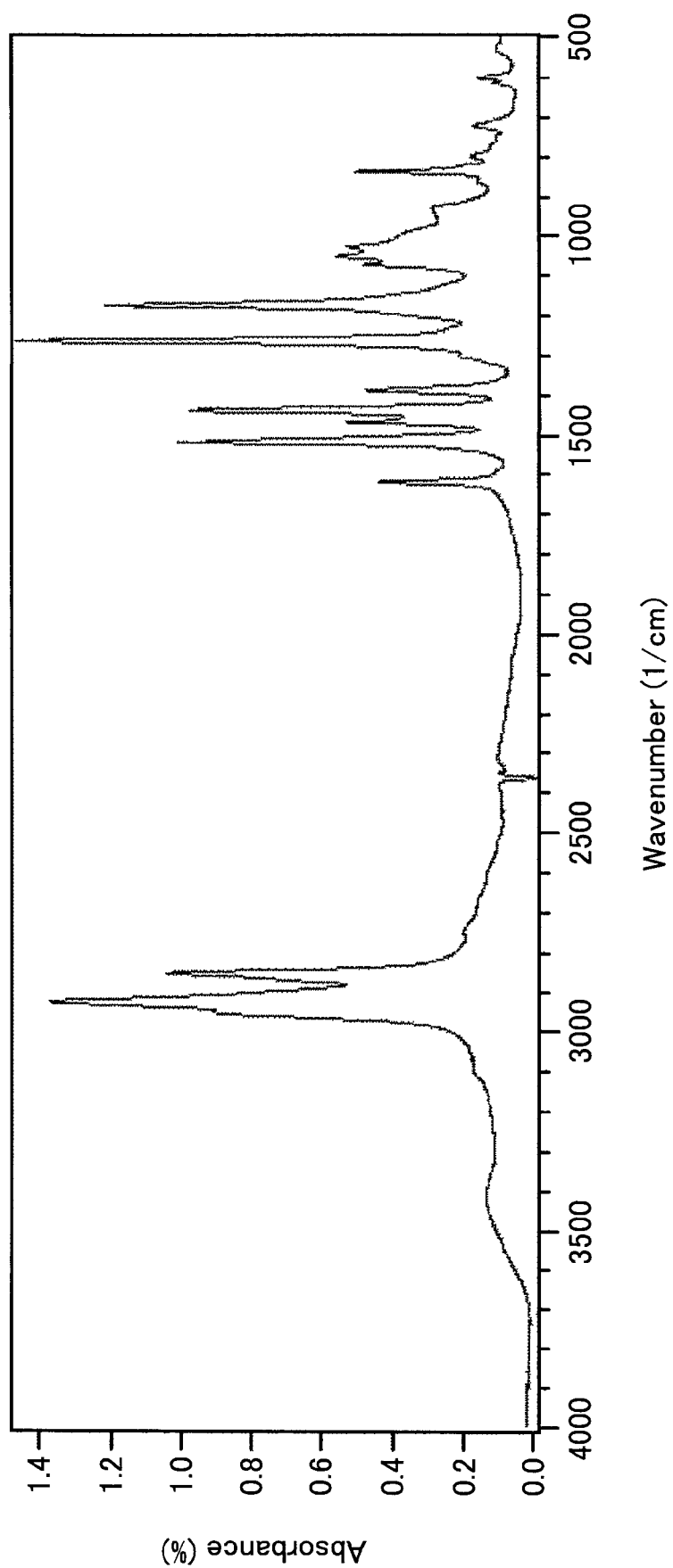
FIG. 20 is an IR spectrum chart of [16-(3,6,7,10,11-pentakishexyloxytriphenylene-2-yloxy)-hexadecyl]-phosphonic acid (general formula (1)) obtained in Synthesis Example 1.
Figure 21:
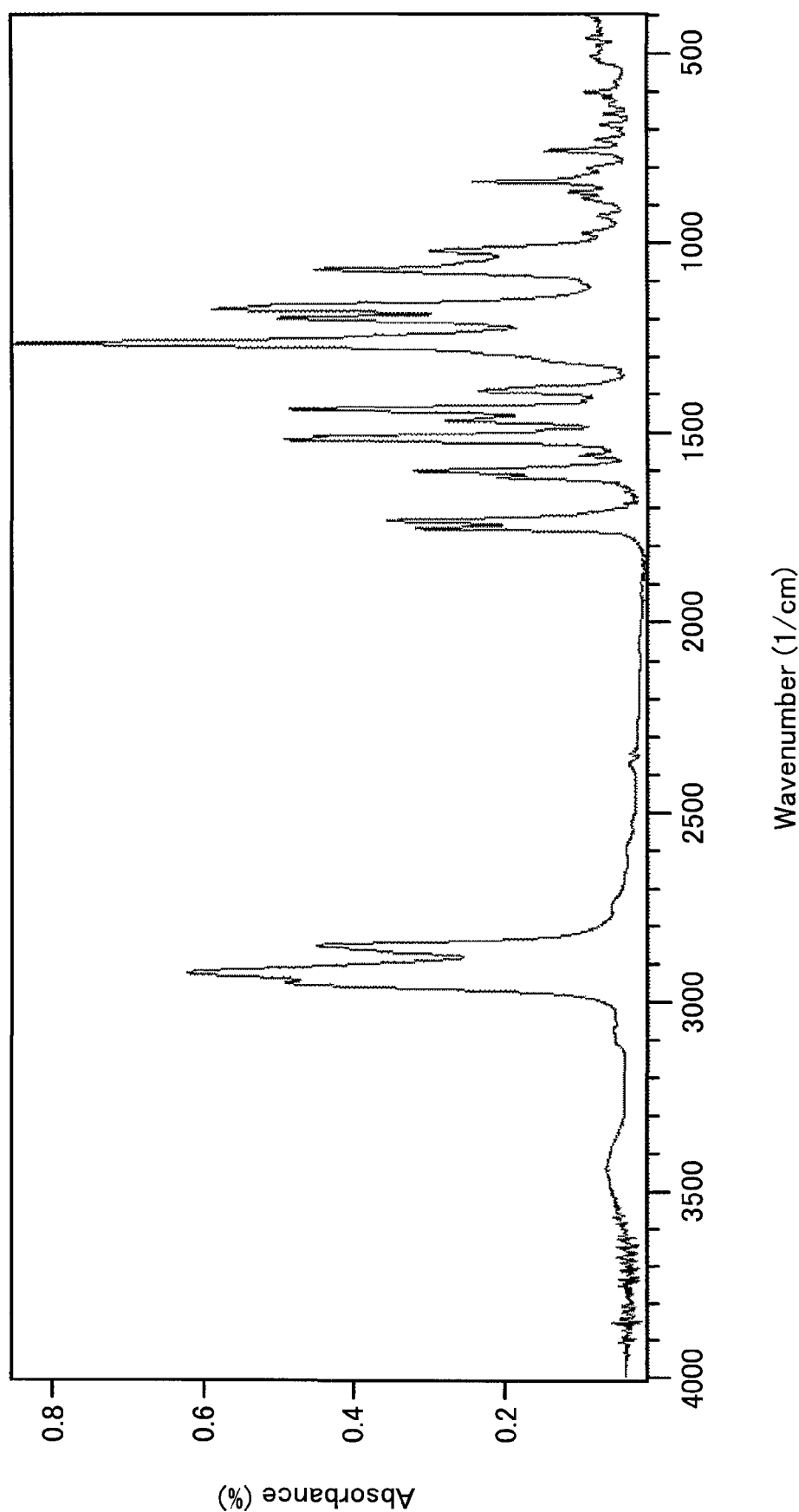
FIG. 21 is an IR spectrum chart of 2-chloro-4-[9-(3,6,7,10,11-pentakis-hexyloxy-triphenylene-2-yloxy)-nonanoiloxy]-benzoic acid 4-(4-pentyloxy-phenoxycarbonyl)-phenyl ester (general formula (2)) obtained in Synthesis Example 2.

Next, after alternately applying voltages of 5 V-100 kHz and 5 V-1 kHz three times to the above liquid crystal display device, an orthoscopic image of the liquid crystal display device was observed using a polarizing microscope while applying a voltage of 5 V-100 kHz. FIG. 16 is an orthoscopic image of the liquid crystal display device. The liquid crystal composition was uniformly aligned parallel to the substrate surface, i.e., was in a cholesteric phase. Then, the voltage of 5 V-100 kHz was turned off, and orthoscopic images were observed, respectively, at 1 hour, 24 hours, and 48 hours after turning off the voltage. The results are shown in FIGS. 17, 18, and 19. FIGS. 17, 18, and 19 indicate that the cholesteric phase is maintained throughout the liquid crystal composition even when no voltage is being applied.

As described above, embodiments of the present invention make it possible to provide a liquid crystal display device with a uniform liquid crystal alignment film having an excellent vertical alignment property without using a high-temperature heating process and a rubbing process, and thereby make it possible to provide a memory liquid crystal display device having excellent bistability and a display apparatus including the liquid crystal display device.

In other words, embodiments of the present invention make it possible to prevent disturbance of liquid crystal alignment and thereby to prevent display defects of a liquid crystal display device.

The present invention is not limited to the specifically disclosed embodiments, and variations and modifications may be made without departing from the scope of the present invention.

The present application is based on Japanese Priority Application No. 2007-151561 filed on Jun. 7, 2007 and Japanese Priority Application No. 2008-139559 filed on May 28, 2008, the entire contents of which are hereby incorporated herein by reference.

What is claimed is:

1. A liquid crystal display device, comprising:
a liquid crystal composition contained in a cell having a liquid crystal alignment film, the liquid crystal alignment film having a lamellar structure and including at least one type of a triphenylene compound (I) represented by general formula (1):

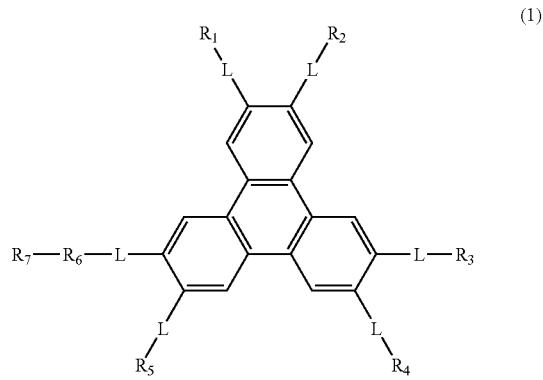

wherein L represents —O— or —S—; $R_1$, $R_2$, $R_3$, $R_4$, and $R_5$ represent the same or different hydrocarbon groups with 4 or more carbon atoms; $R_6$ represents a divalent hydrocarbon group with 4 or more carbon atoms; and $R_7$ represents —$SiR_8R_9R_{10}$ or —P(=O)(OH)$_2$ where $R_8$, $R_9$, and $R_{10}$ each individually represents —Cl, —OH, —OCH$_3$, or —OC$_2$H$_5$.

2. The liquid crystal display device as claimed in claim 1, wherein the liquid crystal composition includes a chiral dopant and at least one type of a triphenylene compound (II) represented by general formula (2):

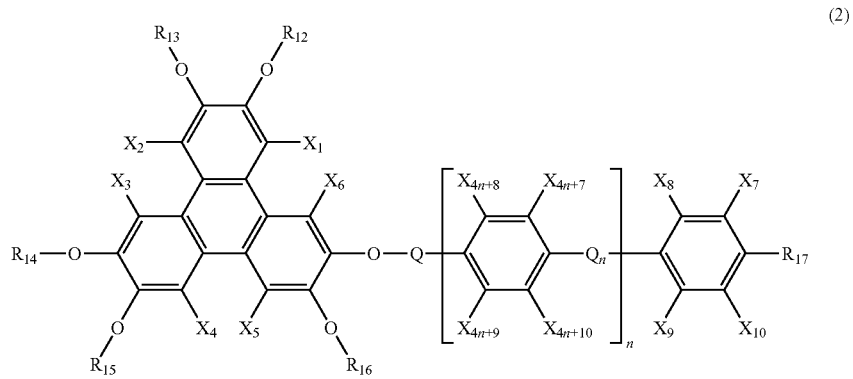

wherein $R_{12}$, $R_{13}$, $R_{14}$, $R_{15}$, and $R_{16}$ represent the same or different hydrocarbon groups with 4 or more carbon atoms; $R_{17}$ represents alkyl, alkoxy, or alkoxycarbonyl with 3 or more carbon atoms; $X_1$, $X_2$, $X_3$, $X_4$, $X_5$, $X_6$, $X_7$, $X_8$, $X_9$, $X_{10}$, $X_{4n+7}$, $X_{4n+8}$, $X_{4n+9}$, and $X_{4n+10}$ each represents a hydrogen atom, a fluorine atom, or a chlorine atom where n represents an integer not smaller than 1; Q represents a divalent group with 4 or more carbon atoms which divalent group has —C(=O), —O, —C(=O)—O, or —O—C(=O) at one end or both ends; and $Q_n$ represents —C(=O)—O— or —O—C(=O)—.

3. A display apparatus comprising the liquid crystal display device of claim 1.

4. A display apparatus comprising the liquid crystal display device of claim 2.

* * * * *